US011115255B2

(12) United States Patent
Zoellner et al.

(10) Patent No.: US 11,115,255 B2
(45) Date of Patent: Sep. 7, 2021

(54) TRANSMITTER AND RECEIVER FOR COMMUNICATION USING AT LEAST TWO DIFFERENT RF CHANNELS

(71) Applicant: SATURN LICENSING LLC, New York, NY (US)

(72) Inventors: Jan Zoellner, Braunschweig (DE); Lothar Stadelmeier, Stuttgart (DE); Nabil Sven Loghin, Freiburg (DE); Daniel Schneider, Stuttgart (DE)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/989,772

(22) Filed: Aug. 10, 2020

(65) Prior Publication Data

US 2020/0374174 A1 Nov. 26, 2020

Related U.S. Application Data

(63) Continuation of application No. 15/533,113, filed as application No. PCT/EP2015/079025 on Dec. 8, 2015, now Pat. No. 10,756,938.

(30) Foreign Application Priority Data

Dec. 12, 2014 (EP) .................................. 14197731
Jan. 20, 2015 (EP) .................................. 15151717
Feb. 18, 2015 (EP) .................................. 15155607

(51) Int. Cl.
*H04L 27/26* (2006.01)
*H04L 1/00* (2006.01)
(Continued)

(52) U.S. Cl.
CPC ........ *H04L 27/2627* (2013.01); *H04L 1/0042* (2013.01); *H04L 1/0045* (2013.01);
(Continued)

(58) Field of Classification Search
CPC . H04L 27/2627; H04L 1/0057; H04L 1/0045; H04L 1/0042; H04L 25/14; H04L 5/001; H04L 1/0071; H04L 27/2649
See application file for complete search history.

(56) References Cited

U.S. PATENT DOCUMENTS 8,274,878 B2 9/2012 Stadelmeier et al.
10,756,938 B2\* 8/2020 Zoellner ................. H04L 5/001
(Continued)

FOREIGN PATENT DOCUMENTS

| CN | 101005478 A | 7/2007 |
|---|---|---|
| CN | 101110626 A | 1/2008 |

(Continued)

OTHER PUBLICATIONS

Draft ETSI EN 302 307-2 V1.1.1; European Standard; Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X), EBU Operating Durovision, 139 pages.

(Continued)

*Primary Examiner* — Omar J Ghowrwal
(74) *Attorney, Agent, or Firm* — Oblon, McClelland, Maier & Neustadt, L.L.P.

(57) ABSTRACT

A transmitter and a receiver for communicating data using at least two separate RF channels using channel bundling. The transmitter includes a data stream partitioner configured to partition a data stream of data to be communicated into two or more stream partitions, two or more modulators configured to each receive a stream partition and to generate modulated data from the received stream partition, and an interleaver configured to assign the modulated data gener- (Continued)

ated by a modulator from a received stream partition to different RF channels for transmission.

18 Claims, 24 Drawing Sheets

(51) Int. Cl.
 *H04L 5/00* (2006.01)
 *H04L 25/14* (2006.01)
(52) U.S. Cl.
 CPC .......... *H04L 1/0057* (2013.01); *H04L 1/0071* (2013.01); *H04L 5/001* (2013.01); *H04L 25/14* (2013.01); *H04L 27/2649* (2013.01)

(56) References Cited

U.S. PATENT DOCUMENTS

| | | |
|---|---|---|
| 2005/0159115 A1 | 7/2005 | Sandhu |
| 2005/0220211 A1 | 10/2005 | Shim |
| 2007/0041461 A1 | 2/2007 | Lu |
| 2007/0140103 A1 | 6/2007 | Ouyang et al. |
| 2007/0147521 A1 | 6/2007 | Horng et al. |
| 2008/0034271 A1 | 2/2008 | Markman |
| 2009/0304099 A1 | 12/2009 | Waller et al. |
| 2010/0027697 A1 | 2/2010 | Malladi et al. |
| 2010/0290561 A1 | 11/2010 | Ko |
| 2012/0177089 A1 | 7/2012 | Pelletier |
| 2012/0314790 A1 | 12/2012 | Stadelmeier et al. |
| 2015/0049773 A1 | 2/2015 | Yang |
| 2015/0078473 A1 | 3/2015 | Ko |
| 2015/0171997 A1 | 6/2015 | Ko et al. |
| 2015/0172001 A1 | 6/2015 | Kim |
| 2015/0358648 A1 | 12/2015 | Limberg |
| 2015/0372845 A1* | 12/2015 | Yoshimochi .......... H04L 5/0044 370/542 |

FOREIGN PATENT DOCUMENTS

| | | |
|---|---|---|
| CN | 101272372 A | 9/2008 |
| CN | 101924606 A | 12/2010 |
| EP | 2 043 291 A2 | 4/2009 |
| EP | 2 043 291 A3 | 4/2009 |
| JP | 2010-509861 A | 3/2010 |
| JP | 2013-542644 A | 11/2013 |
| JP | 2013-545336 A | 12/2013 |
| WO | WO 2014/195303 A1 | 12/2014 |

OTHER PUBLICATIONS

Lothar Stadelmeier; ATSC 3.0—Introduction to channel bundling, Nov. 11, 2014, 7 pages.
Technical Specification, "Digital Video Broadcasting (DVB); Implementation Guidelines for a second generation digital cable transmission system (DVB-C2)," ETSI TS 102 991 V1.2.1, Jun. 2011, (165 pages).
European Standard (Telecommunications series), "Digital Video Broadcasting (DVB); Frame structure channel coding and modulation for a second generation digital transmission system for cable systems (DVB-C2)." ETSI EN 302 769 V1.1.1, Apr. 2010, (110 pages).
International Search Report dated Feb. 25, 2016 in PCT/EP2015/079025 filed Dec. 8, 2015.
Combined Chinese Office Action and Search Report dated Mar. 4, 2021 in Chinese Patent Application No. 201580067711.3 (with English translation), 7 pages.
Peng Tao, "Research on the Key Wireless Transmission Technologies Based on Interleave Division Multiplexing" University of Electronic Science and Technology of China, May 15, 2014, 121 pages.

\* cited by examiner (a)

(b)

TRANSMITTER AND RECEIVER FOR COMMUNICATION USING AT LEAST TWO DIFFERENT RF CHANNELS

CROSS REFERENCE TO RELATED APPLICATIONS

This application is a continuation of U.S. application Ser. No. 15/533,113, filed Jun. 5, 2017, which is a National Phase application of PCT/EP2015/079025, filed Dec. 8, 2015, which claims priority to European Patent Application No. 15155607.3, filed Feb. 18, 2015; European Patent Application No. 15151717.4, filed Jan. 20, 2015; and European Patent Application No. 14197731.4, filed Dec. 12, 2014. The entire content and disclosure of U.S. application Ser. No. 15/533,113 is incorporated by reference into the present application.

BACKGROUND

Field of the Disclosure

The present disclosure relates to a transmitter and a corresponding method for communicating data using at least two separate RF channels. The present disclosure relates further to a receiver and a corresponding method for receiving data using at least two separate RF channels.

Description of Related Art

Channel bundling of multiple, separate RF channels to enable total service data rates that exceed the net capacity of a single RF channel is generally known. For instance, channel bundling may be applied above the physical layer, i.e. upper layer solutions take care to split the overall data stream on transmitter side into portions that fit to the capacity of the different single RF channels. Upper layer signaling may be provided that allows the data recombination of the different RF channels in a sorted and stream type consistent way. Channel bundling is processed in a transparent way for all involved RF channels, i.e. the output stream on receiver side is equal to the corresponding input stream on transmitter side. RF channels can be located at any channel frequencies, not necessarily adjacent to each other.

In an ATSC3.0 system it is proposed that each RF channel is handled as a standalone ATSC 3.0 signal. There are no special measures required on the physical layer for bundled channels such as additional guard bands, additional pilots, synchronization etc. Especially the concept of RF channel bundling allows reusing multiple existing LDPC encoder and decoder as well as standard RF tuners, which helps to reduce the overall complexity and simplifies the introduction of high data rate services beyond the capacity of a single RF channel.

In all proposed approaches stream partitioning on transmitter (Tx) side as well as stream recombination (or also denoted as joint BB (baseband packet) de-framing in some figures) on receiver (Rx) side is performed outside the physical layer. The known solution has a significant drawback: As the different channels are completely decoupled, the overall performance of the large input stream suffers from different channel conditions on different RF channels. The main reason is that the transmitter as well as the receiver for every allocated RF channel deploys an own, independent FEC (Forward Error Correction) encoder and decoder. If one or several channels suffer from insufficient SNR or other channel impairments for correct data decoding, the overall recombined stream would still result in a corrupted data stream with errors.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a transmitter and a corresponding method for communicating data using at least two separate RF channels which particularly allow a relatively simple and scalable implementation, support bundling of distant and neighboring channels, provide additional frequency diversity, provide SNR averaging and work for single and multiple data streams. It is a further object to provide a corresponding receiver and method for receiving data using at least two separate RF channels. It is a still further object to provide a corresponding computer program and a non-transitory computer-readable recording medium for implementing said methods.

According to an aspect there is provided a transmitter for communicating data using at least two separate RF channels, said transmitter comprising:
  a data stream partitioner configured to partition a data stream of data to be communicated into two or more stream partitions,
  two or more modulators configured to each receive a stream partition and to generate modulated data from the received stream partition, and
  an interleaver configured to assign the modulated data generated by a modulator from a received stream partition to different RF channels for transmission.

According to a further aspect there is provided receiver and a corresponding method for receiving data using at least two separate RF channels, said receiver comprising:
  a deinterleaver configured to receive data of a received data stream via at least two separate RF channels, wherein the data of stream partitions of the data stream are transmitted via the at least two RF channels, and to assign the data belonging to the same stream partition transmitted via different RF channels to different demodulators,
  two or more demodulators configured to each receive data of a stream partition and to generate demodulated data from the received data of the stream partition,
  a data stream combiner configured to combine the demodulated data of the two or more demodulators into the data stream.

According to still further aspects corresponding methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Example embodiments are defined in the dependent claims. It shall be understood that the disclosed methods, the disclosed computer program and the disclosed computer-readable recording medium have similar and/or identical example embodiments as the claimed transmitter and receiver, respectively, and as defined in the dependent claims.

One of the aspects of the disclosure is to use channel bundling based on multiple RF channels, in particular with SNR averaging across different RF channels. The present disclosure uses spreading of the output data from encoding across the available RF channels. The spreading may take place in different stages of the transmitter and receiver. Two example embodiments refer to spreading on OFDM symbol level and the spreading based on PLP level.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

This disclosure describes an apparatus, method and system for transmitting and receiving data. In some embodiments the disclosure relates to broadcast transmission and reception of data. In some embodiments the data may be audio/video data. Some embodiments describe channel bundling based on multiple RF channels, in particular with SNR averaging across different RF channels.

First, the background and existing architectures will be described.

A current proposal for the upcoming ATSC3.0 standard foresees channel bundling of multiple, separate RF channels to enable total service data rates that exceed the net capacity of a single RF channel. Channel bundling is applied above the physical layer in this proposal, i.e. upper layer solutions take care to split the overall data stream on transmitter side into portions that fit to the capacity of the different single RF channels. Upper layer signaling is provided that allows the data recombination of the different RF channels in a sorted and stream type consistent way. Channel bundling is processed in a transparent way for all involved RF channels, i.e. the output stream on receiver side is equal to the corresponding input stream on transmitter side. RF channels can be located at any channel frequencies, not necessarily adjacent to each other.

Each RF channel is handled as a standalone ATSC 3.0 signal. There are no special measures required on the physical layer for bundled channels such as additional guard bands, additional pilots, synchronization etc. Especially the concept of RF channel bundling allows reusing multiple existing LDPC encoder and decoder as well as standard RF tuners, which helps to reduce the overall complexity and simplifies the introduction of high data rate services beyond the capacity of a single RF channel.

In all proposed approaches stream partitioning on transmitter (Tx) side as well as stream recombination (or also denoted as joint BB (baseband packet) de-framing in some figures) on receiver (Rx) side is performed outside the physical layer.

In general the different approaches are explained in the following for two RF channels. Of course it is straight forward to extend the principles to more than two bundled RF channels.

Figure 1:
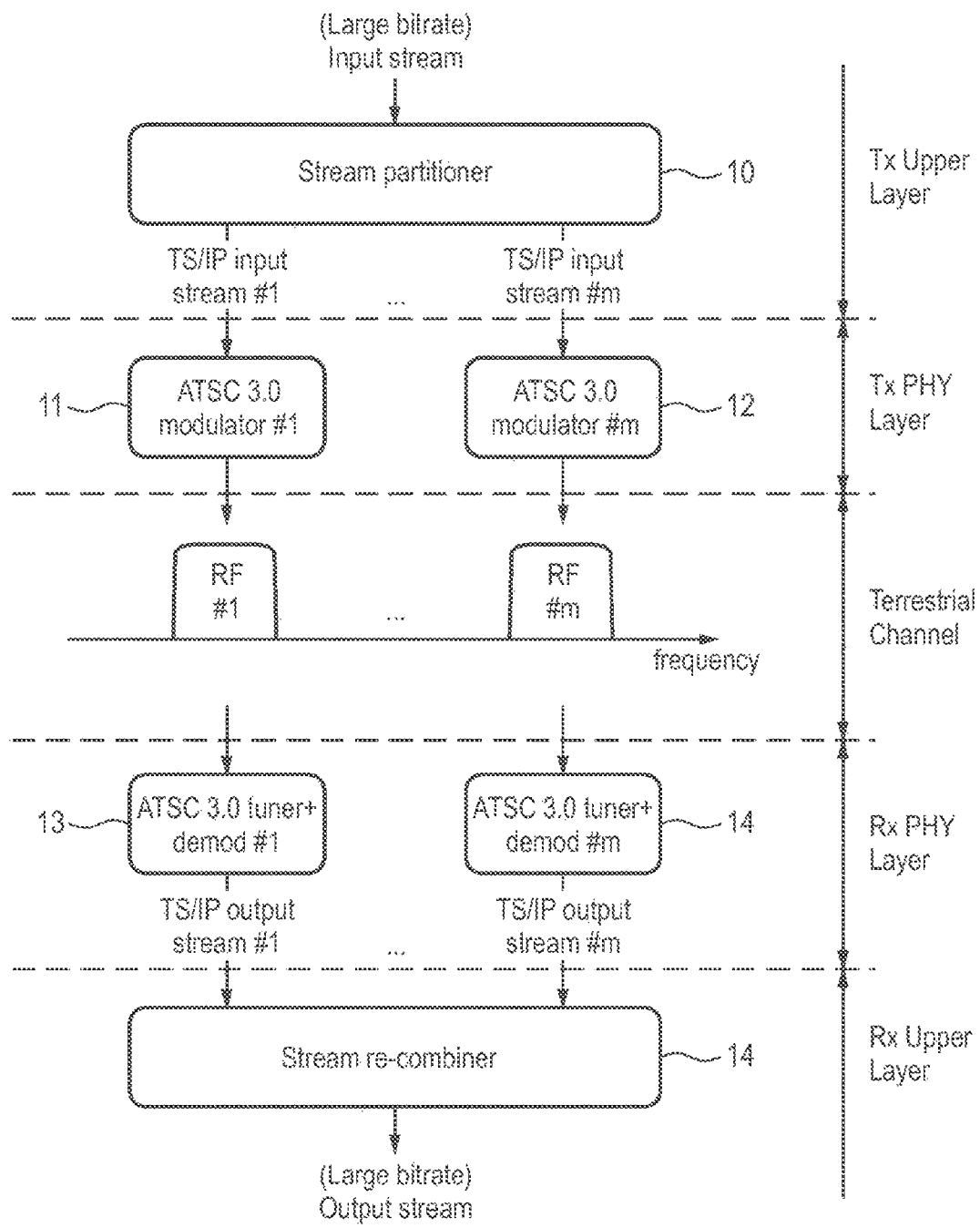
FIG. 1 shows a schematic diagram of a current proposal of a channel bundling architecture.

FIG. 1 shows the principle of the currently proposed channel bundling mechanism as described in a call for technologies response. PCT patent application PCT/

EP2014/061467 and the priority applications on which it is based are hereby incorporated by reference in their entirety.

On the transmitter (Tx) side a stream partitioner 10 partitions the input stream into m TS/IP input streams, which are then separately modulated by m separate modulators 11, 12 into m RF streams for transmission over the terrestrial channel. On the receiver (Rx) side the received RF streams are separately demodulated by m demodulators 13, 14 into m demodulated streams, which are then re-combined by a stream re-combiner 15 into the output stream.

Although the above mentioned solution of the known proposal realizes the simplest solution for channel bundling, it has a significant drawback. As the different channels are completely decoupled, the overall performance of the large input stream suffers from different channel conditions on different RF channels. The main reason is that the transmitter as well as the receiver for every allocated RF channel deploys an own, independent FEC (Forward Error Correction) encoder and decoder. If one or several channels suffer from insufficient SNR or other channel impairments for correct data decoding, the overall recombined stream would still result in a corrupted data stream with errors.

Figure 2:
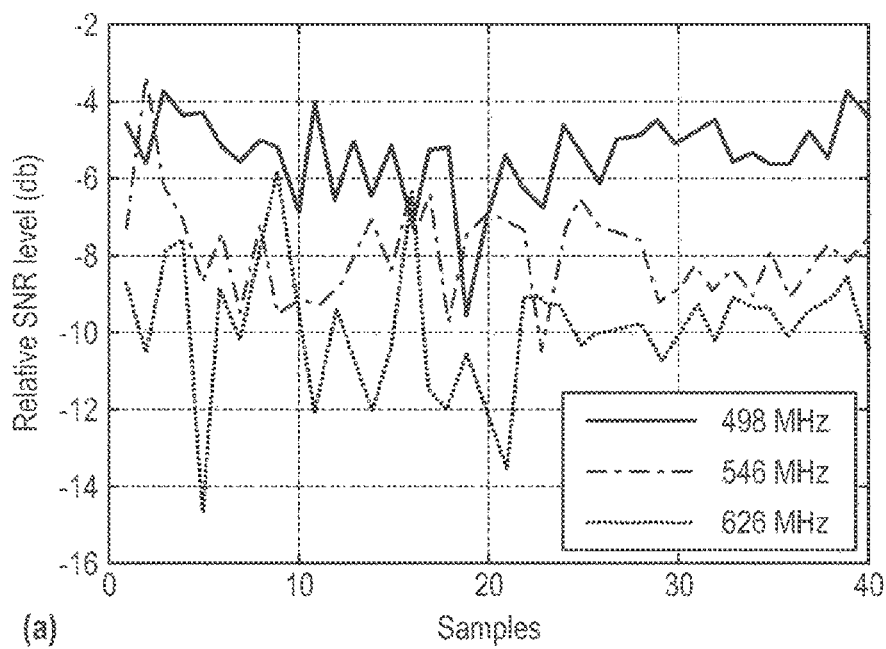
FIG. 2 shows a diagram of SNR variations of different terrestrial RF channels.
Figure 2:
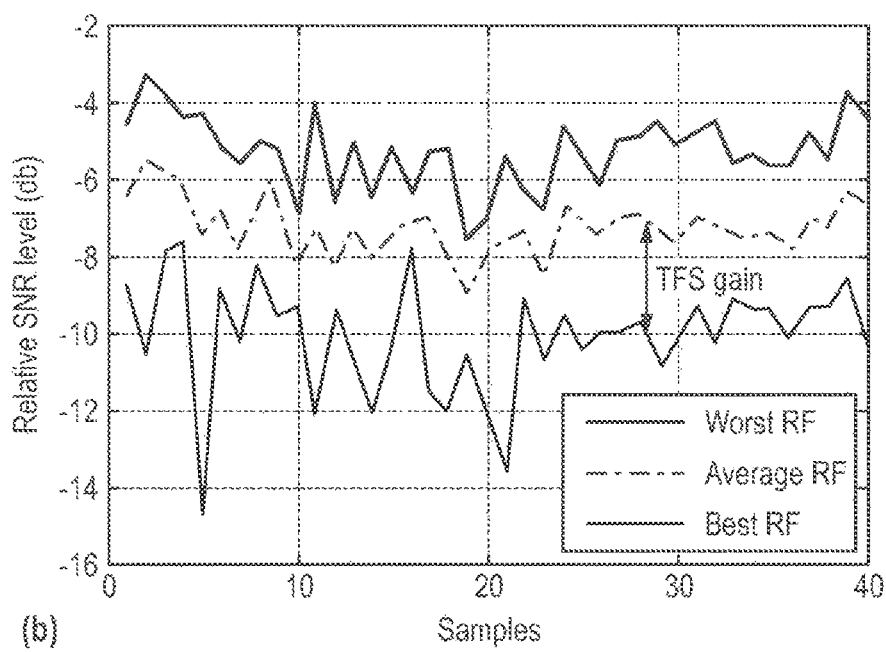

As an example, the plots shown in FIG. 2 illustrate measured SNR variations on different terrestrial RF channels from a Swedish operator (Teracom).

Next, existing channel bundling architectures without SNR averaging are described. In particular, existing non terrestrial broadcast systems with channel bundling will be described.

It should be noted first that the channel bundling concept has already been introduced in other broadcasting systems, such as DVB-C2 and DVB-S2x. However in cable and satellite channel no big amplitude changes across the involved RF channels or Data Slices are expected. Therefore an exchange of data cells between the different Tx signal streams for SNR averaging is not required. Nevertheless the principle of the C2 and S2x channel bundling is briefly explained here.

A DVB-C2 system allows spreading data of a single PLP (Physical Layer Pipe) connection over different data slices. This operation mode is intended for advanced services that require throughput rates above the capacity of a single data slice.

Figure 3:
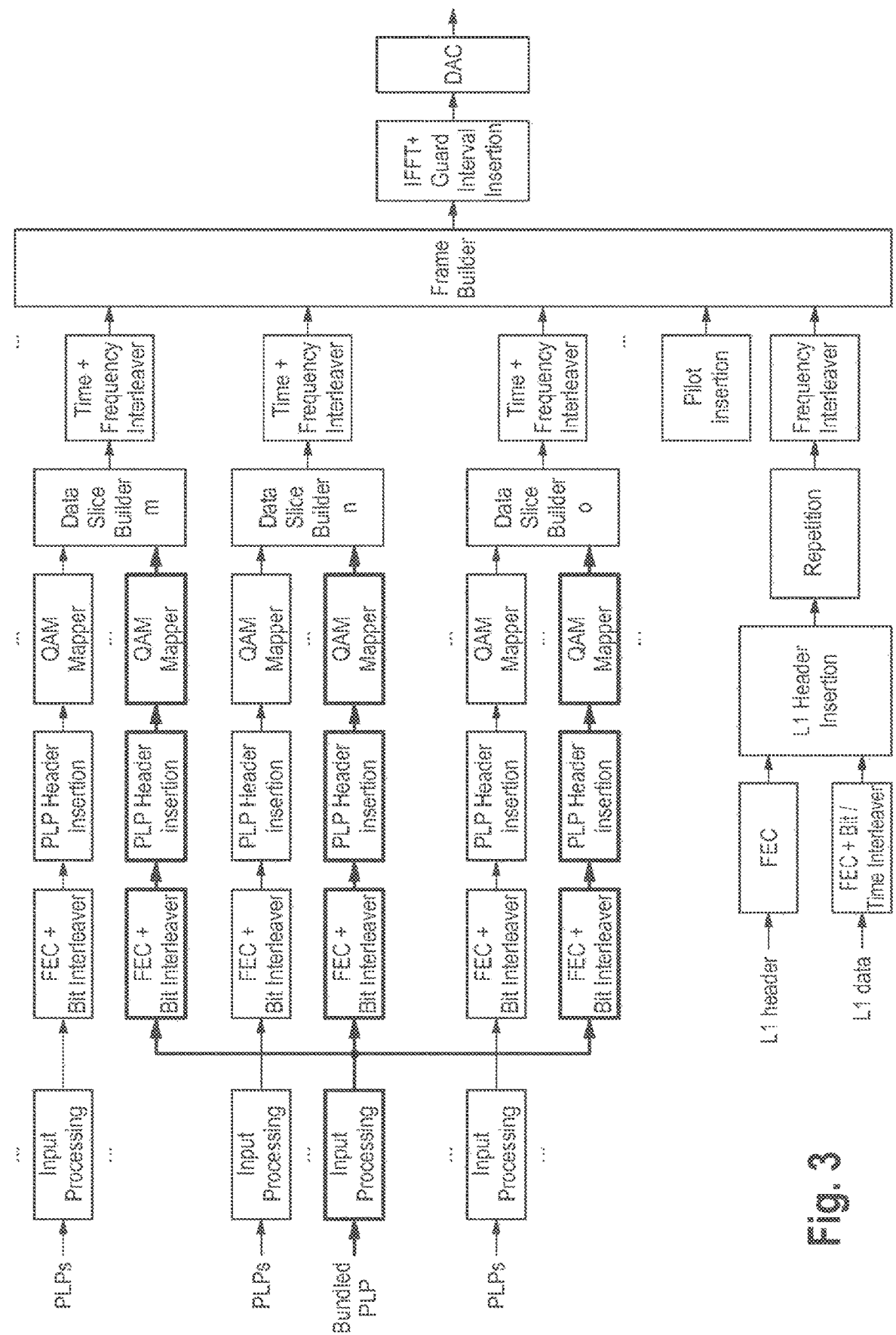
FIG. 3 shows a schematic diagram of channel bundling in DVB-C2.

All data packets of a bundled PLP connection pass the same input processing block. Inserting the ISSY timestamp in the mode adaptation block allows the reordering of the packets from different data slices on receiver side. At the output of the input processing block the BBFrames of the bundled PLP are spread over the different data slices. FIG. 3 illustrates a schematic diagram of a system using channel bundling in DVB-C2.

Figure 4:
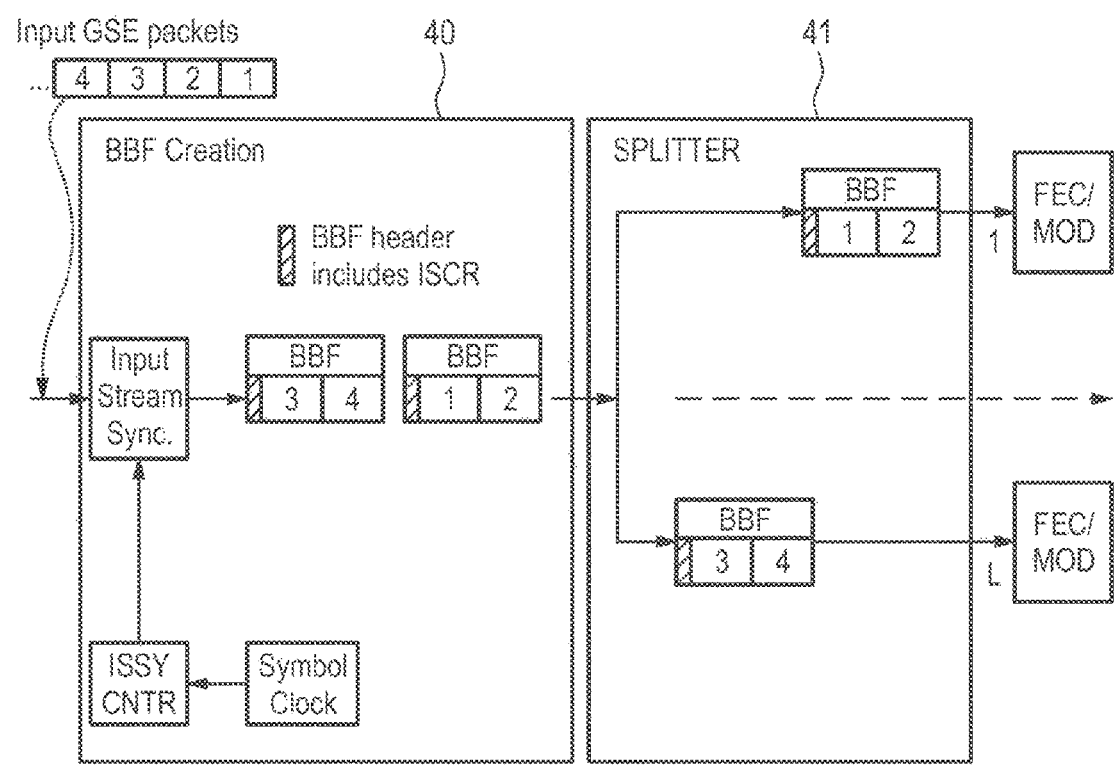
FIG. 4 shows a schematic diagram of channel bundling in DVB-S2x.

In DVB-S2x a similar approach (illustrated in FIG. 4) is followed as in DVB-C2: A single input stream is carried in parallel over max 3 transponders. As in DVB-C2 the data of a big input PLP passes the same input processing block 40, in 'High efficiency mode (HEM)' every BBFrame gets its own ISSY timestamp that allows reordering on Rx side. Splitting is performed in splitter 41 after the BBFrame creation. FIG. 4 illustrates channel bundling in DVB-S2x. Every RF channel can use its own PHY parameters, such as symbol rate, modulation and coding settings.

Next, current proposals for terrestrial channel bundling mechanisms as disclosed herein will be described. First, existing channel bundling approaches for terrestrial systems are described.

Figure 5:
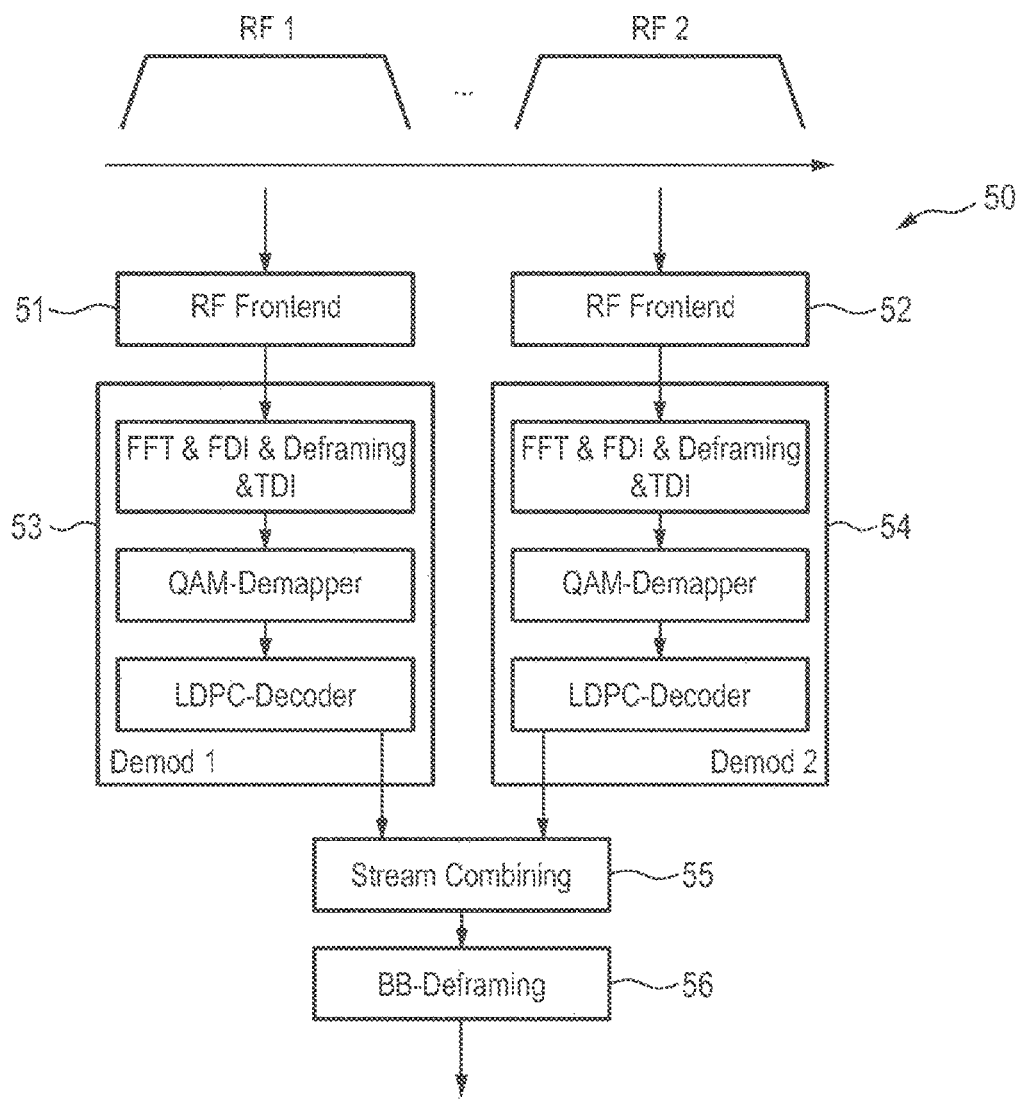
FIG. 5 shows a schematic diagram of a multi tuner channel bundling receiver architecture.

The transmitter processing is done as described above with respect to existing architectures. For two separate RF channels the related dual tuner receiver architecture is shown in FIG. 5, which illustrates a multi tuner channel bundling receiver architecture 50.

It should be noted that decoding of every RF channel is performed independently by separate RF frontends 51, 52 and separate demodulators 53, 53 before joint stream recombination in stream combiner 55 or baseband (BB) de-framing by de-framing unit 56 at the very end of the processing chain. Accordingly a SNR averaging across the two RF channels does not happen.

Some example advantages and disadvantages are stated below. The advantages are:
Simple and scalable implementation
Complete reuse of separate decoder (tuner+demodulator)
Supports bundling of distant and neighbored channels
Additional statistical multiplex gain across the overall bandwidth The disadvantages are:
No additional frequency diversity or SNR averaging
No guard band removal possible for neighboring bundled channels (see also below)

For completeness it shall be mentioned that channel bundling can be also realized by an overall bigger, single RF channel. On Tx side the stream is processed by a higher bandwidth input processing, BICM and time interleaver stages.

Figure 6:
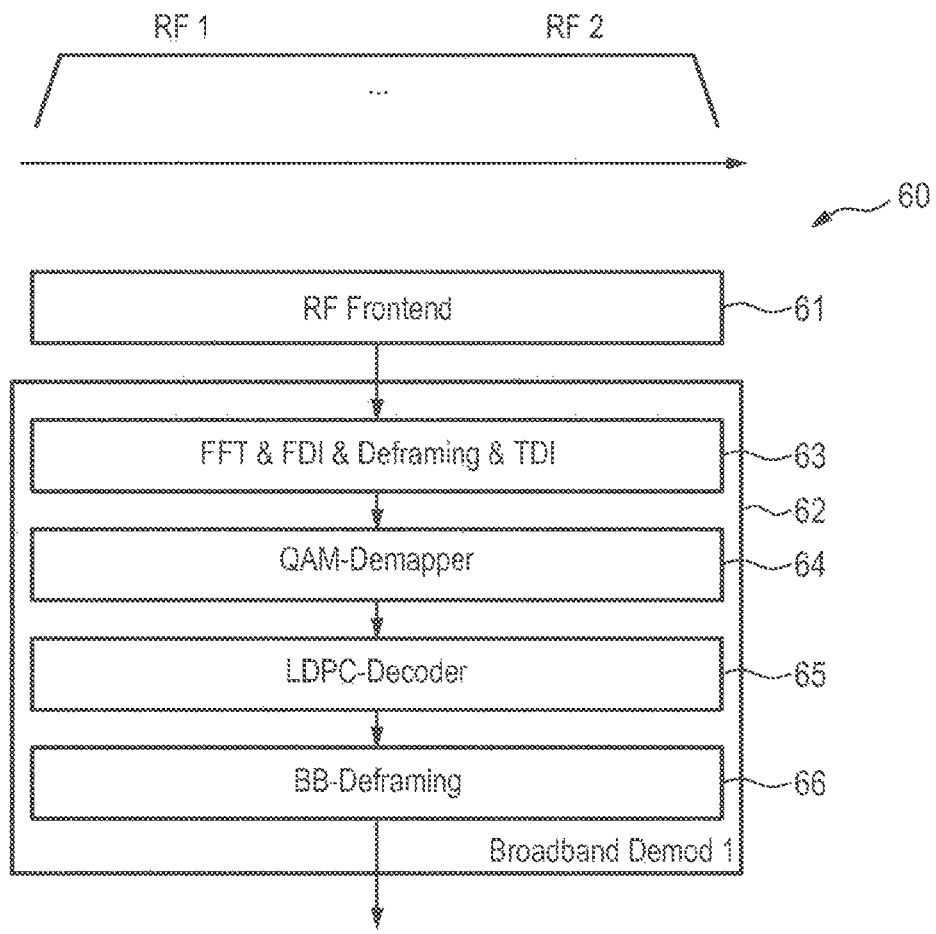
FIG. 6 shows a schematic diagram of a single tuner channel bundling receiver architecture.

On Rx side a single broadband tuner can be used, as shown in FIG. 6 illustrating a single tuner channel bundling receiver architecture 60 including an RF frontend 61 and a demodulator 62 (including a combined unit 63 for FFT, FDI (frequency domain interleaving), deframing and TDI (time domain interleaving), a QAM-demapper 64, an LDPC-decoder 65 and a BB-deframing unit 66).

Example advantages and disadvantages of this approach are listed below. The advantages are:
Additional frequency diversity
TFS-like (time frequency slicing) SNR averaging
Additional statistical multiplex gain across the overall bandwidth
Guard band between neighboring bundled channels can be removed The disadvantages are:
Complex implementation
No bundling of distant channels possible Next, the proposed channel bundling with SNR averaging will be described. A technology is proposed allowing for SNR averaging across all involved RF channels. Most important element is the spreading of the output data from every FEC encoder (LDPC encoder) across the available RF channels. The spreading may take place in different stages of the TX and RX chain. Two options, namely the spreading on OFDM symbol level and the spreading based on PLP level are described in the following.

Figure 7:
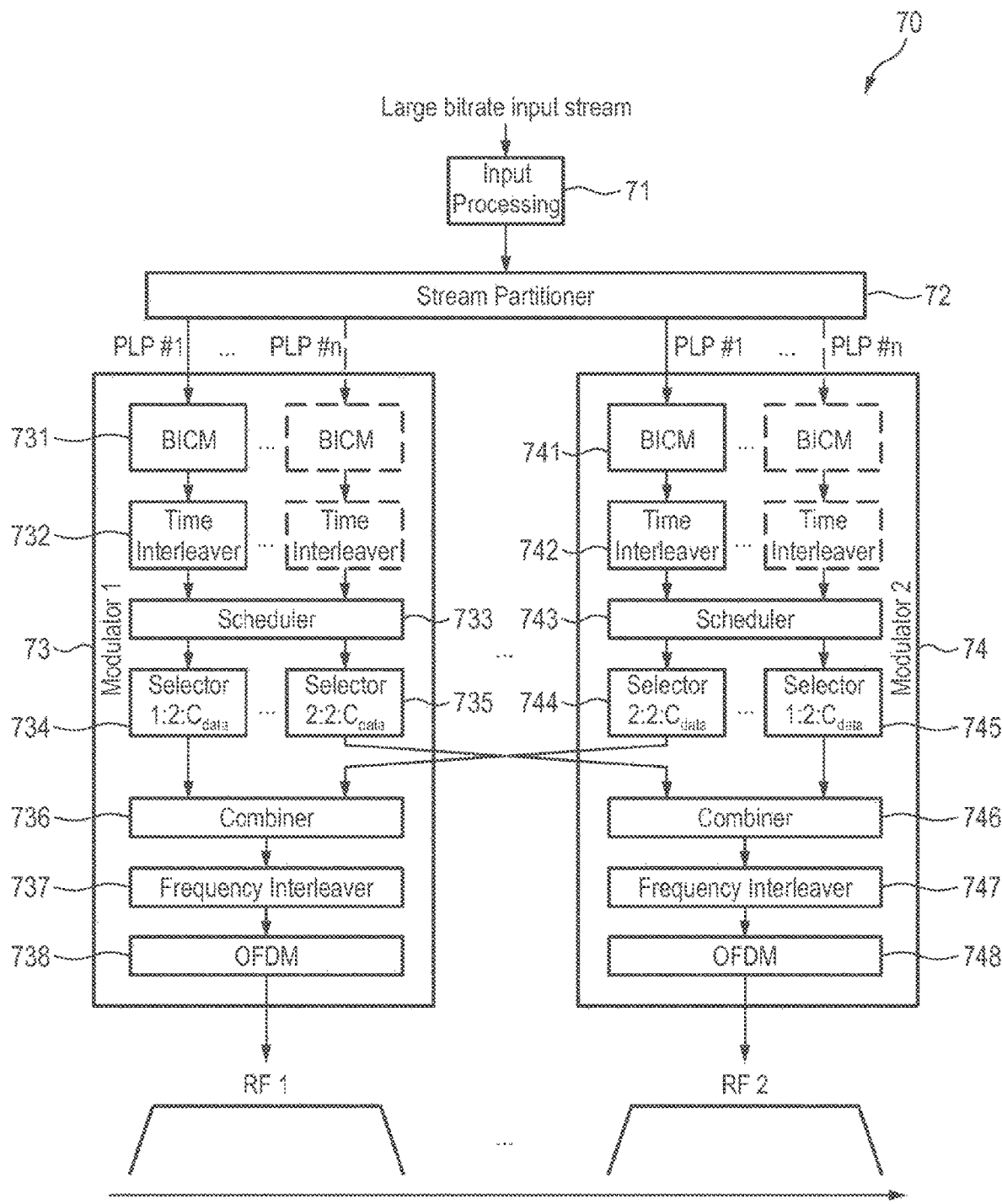
FIG. 7 shows a schematic diagram of a Tx side processing for channel bundling on cell level with an OFDM symbol.

First, spreading based on OFDM symbol level will be described. FIG. 7 shows an example embodiment 70 of the principle on Tx side for single PLP with channel bundling on two RF channels on cell level within an OFDM symbol. In case of PLP bundling the large input stream is, after input processing in the input processing unit 71, divided in the stream partitioner 72 into different partial streams, each of them allocated to a PLP. These PLPs are then fed into the different modulators 73, 74 and can have the same or different PLP IDs. At least a single partial stream allocated to a single PLP #1 is provided to each modulator. It should be noted in this context that the number of PLPs per RF channel does not necessarily have to be the same. For instance, the first RF channel RF1 might carry n PLPs, while the second RF channel RF2 might carry p PLPs with n≠p.

However, in case of a single PLP, the dashed boxes shown in FIG. 7 are in fact inactive.

In typical architectures such as DVB-T2, DVB-NGH and most likely ATSC3.0, different PLPs are passing different input processing BICM stages as well as individual time interleaver. The BICM (Bit interleaved coded modulation) stage 731, 741 consists of FEC encoder (BCH and LDPC), bit interleaver and QAM mapper. After time interleaving by time interleaver 732, 742 the time interleaved QAM cells of every PLP are then scheduled by scheduler 733, 743 onto different OFDM symbols within a frame.

In a regular case, the output of the scheduler 733, 743 is fed directly to the frequency interleaver and OFDM modulator of the related RF channel. In contrast to current solutions it is proposed to exchange (e.g. equally) the scheduled cells of one OFDM symbol across selected or all involved RF channels. This is performed by selectors 734, 735 and combiner 736 in the modulator 73 and the selectors 744, 745 and the combiner 746 in the modulator 74. Subsequently, frequency interleaving by frequency interleavers 737, 747 and OFDM modulation by OFDM modulators 738, 748 is performed to obtain the RF output streams.

Figure 21:
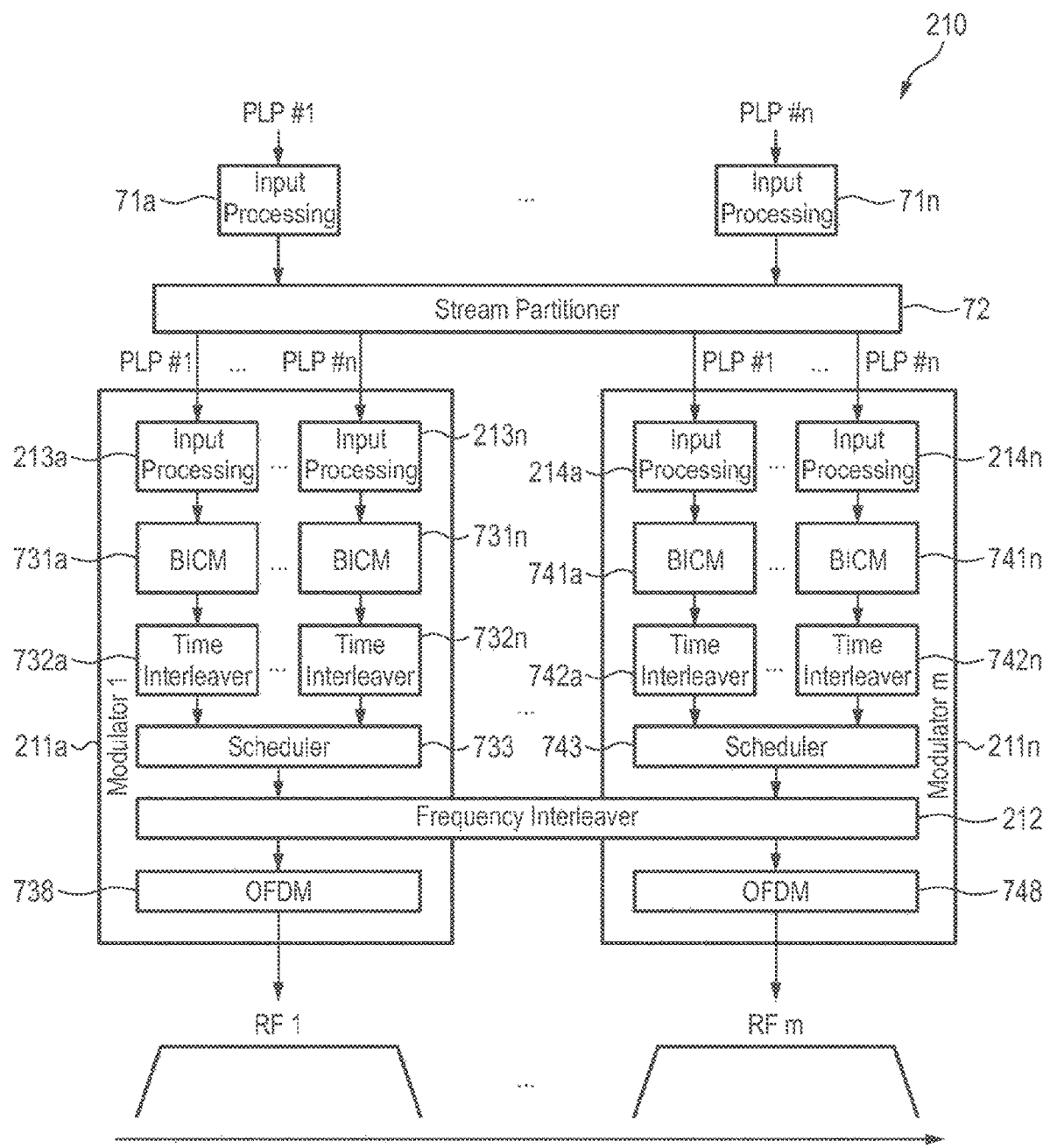
FIG. 21 shows a schematic diagram of an architecture for channel bundling with multiple PLPs using one broadband frequency interleaver.

It should be noted that instead of the shown cell exchange stage and following RF channel frequency interleaver a single frequency interleaver that spans across the overall sum of OFDM subcarriers or resulting bandwidth of all RF channels (example: single 12 MHz frequency interleaver instead of cell exchange and two separate 6 MHz frequency interleavers, see e.g. FIG. 21).

Generally, the proposed transmitter comprises the following elements:
i) a data stream partitioner (in the embodiment 70 realized by the stream partitioner 71) configured to partition a data stream of data to be communicated into two or more stream partitions;
ii) two or more modulators (in the embodiment 70 realized by the modulators 73, 74) configured to each receive a stream partition and to generate modulated data from the received stream partition; and
iii) an interleaver (in the embodiment 70 realized by the selectors 734, 735, 744, 745, the combiners 736, 746 and the frequency interleavers 737, 747; in other embodiments realized by cell exchange circuitry, i.e. the exchange of cells may also be understood as one embodiment of interleaving in the context of the present disclosure) configured to assign the modulated data generated by a modulator from a received stream partition to different RF channels for transmission.

Figure 8:
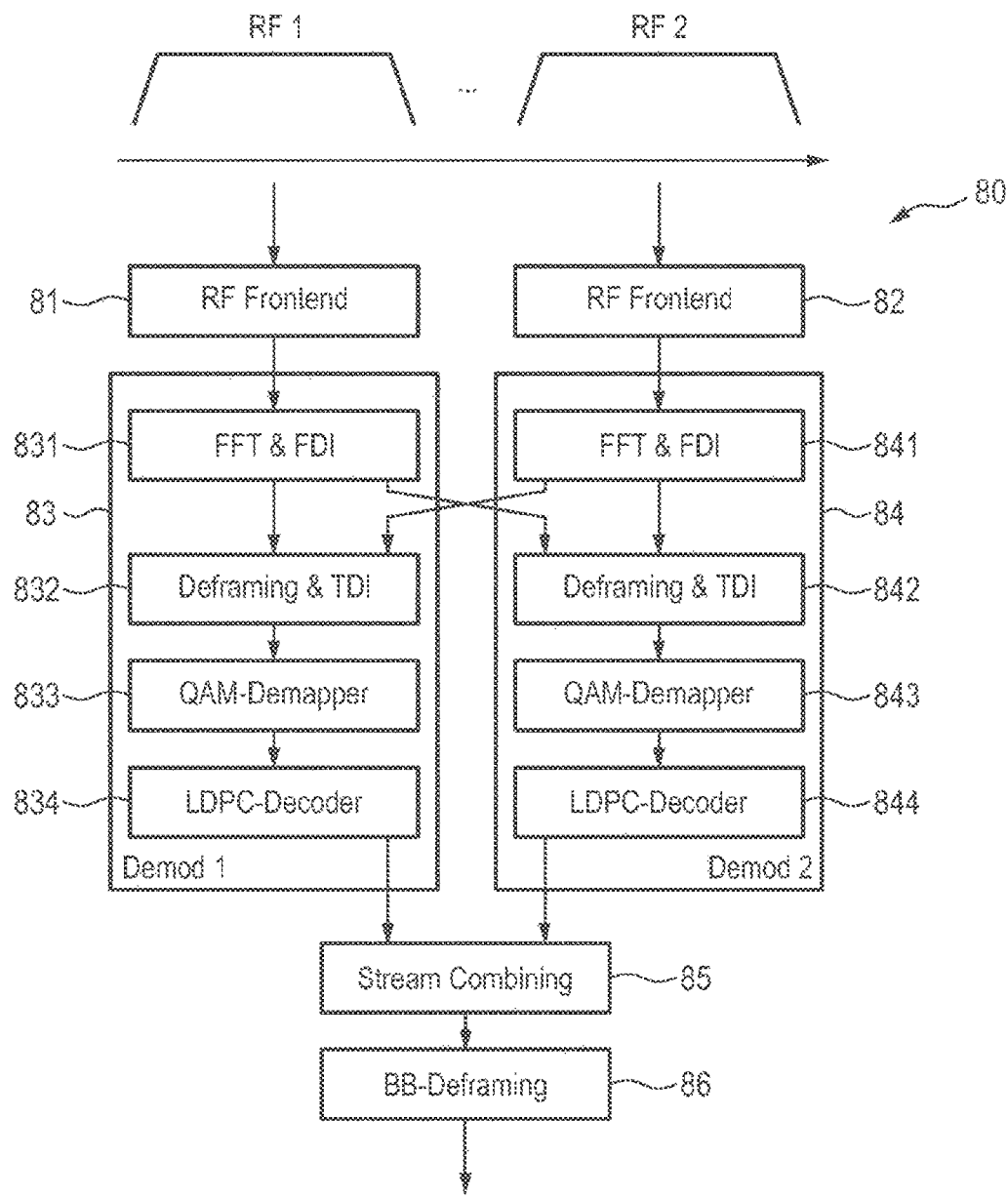
FIG. 8 shows a schematic diagram of the proposed hybrid dual tuner architecture (spreading on OFDM symbol level)

On Rx side, the carrier exchange from Tx side obviously needs to be reversed before the decoding. FIG. 8 shows an example embodiment 80 of the receiver architecture for two RF channels, in particular a proposed hybrid dual tuner architecture (spreading on OFDM symbol level). The disclosure is not limited to two RF channels. The receiver 80 comprises two frontends 81, 82, two demodulators 83, 84, a stream combiner 85 and a de-framing unit 86. Each of said demodulators 83, 84 comprises an FFT and FDI unit 831, 841, a deframing and TDI unit 832, 842, a QAM-demapper 833, 843 and an LDPC-decoder 834, 844. The receiver typically only decodes a single PLP. This is at least the case if one PLP represents one service (e.g. a video stream). In the case that a PLP carries only a service component (e.g. only video or only audio), all PLPs comprising the service need to be decoded.

Generally, the proposed receiver comprises the following elements:
i) a deinterleaver (in the embodiment 80 realized by the FFT and FDI units 811, 821 and the deframing and TDI units 812, 822; in other embodiments realized by cell re-exchange circuitry, i.e. the re-exchange of cells may also be understood as one embodiment of deinterleaving in the context of the present disclosure) configured to receive data of a received data stream via at least two separate RF channels, wherein the data of stream partitions of the data stream are transmitted via the at least two RF channels, and to assign the data belonging to the same stream partition transmitted via different RF channels to different demodulators,
ii) two or more demodulators (in the embodiment 80 realized by the QAM-demappers 813, 823 and the LDPC-decoders 814, 824) configured to each receive data of a stream partition and to generate demodulated data from the received data of the stream partition, and
iii) a data stream combiner (in the embodiment 80 realized by the stream combiner 82) configured to combine the demodulated data of the two or more demodulators into the data stream.

Figure 9:
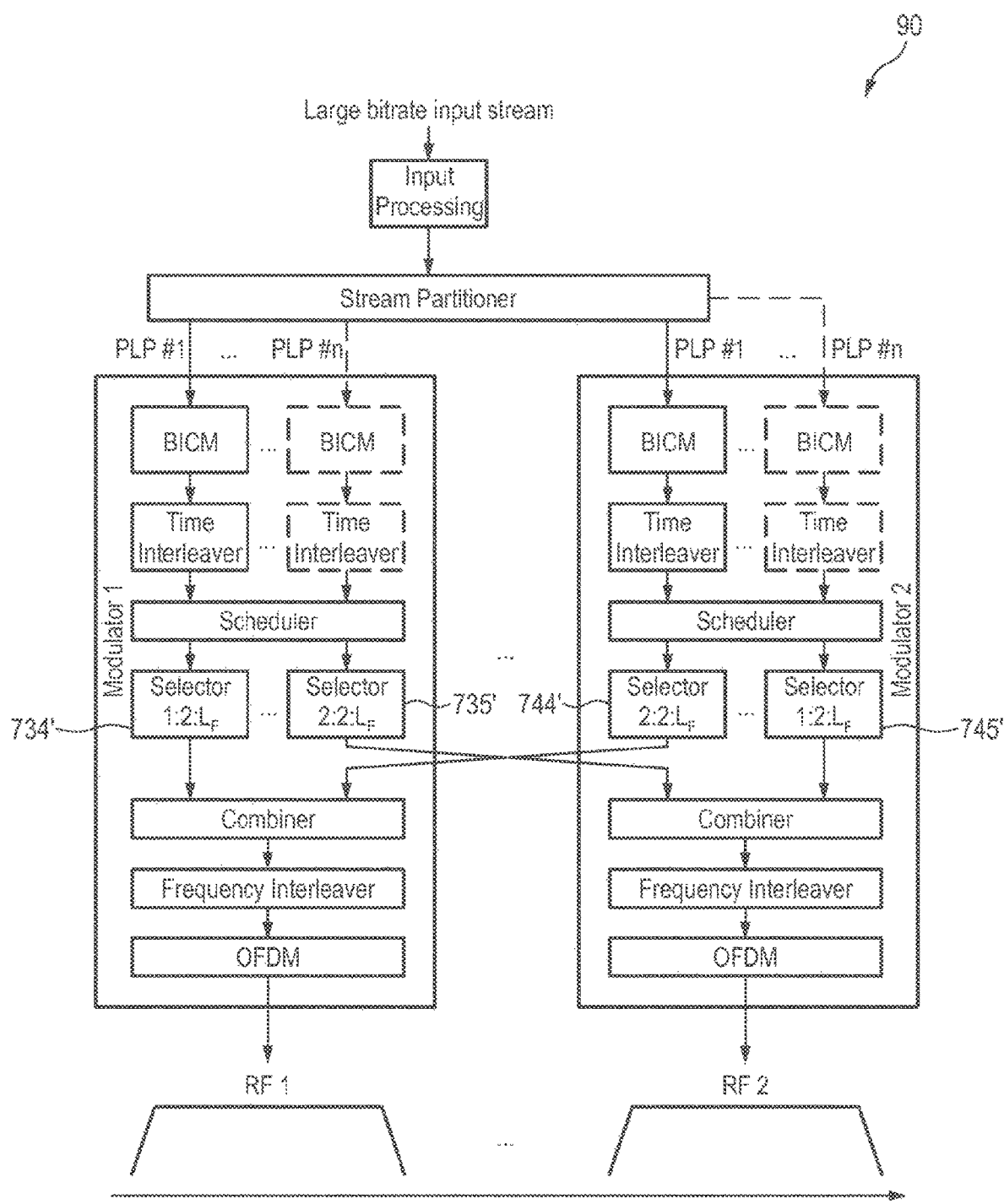
FIG. 9 shows a schematic diagram of the Tx side processing for channel bundling on complete OFDM symbol level.

It is mentioned that the data exchange between the different RF changes can also take place on complete OFDM symbols rather than the above mechanism of cell exchange within an OFDM symbol. Effectively this means that single OFDM symbols out of the $L_F$ OFDM symbols of a frame (typically data symbols only, excluding preamble and signalling symbols) are exchanged between the different modulators. The related block diagram of such an embodiment 90 of the transmitter is shown in FIG. 9, showing Tx side processing for channel bundling on complete OFDM symbol level. It should be noted that the so far cell specific selectors (within an OFDM symbol) 734', 735', 744', 745' are now working on OFDM symbols within a frame, i.e. the granularity of the selectors 734', 735', 744', 745' is different compared to the selectors 734, 735, 744, 745 of the embodiment shown in FIG. 7, which is denoted by the index in the selectors ($L_f$ instead of $C_{data}$).

Of course exchange of any form of multiple OFDM symbols is also possible, but comes with less diversity. The exchange of OFDM symbols is seen as important scenario as it allows for a simple combined architecture of channel bundling with TFS with two tuners. It should be noted that the exchange of OFDM symbols may similarly take place after the frequency interleaver.

Next, spreading based on PLP level will be described.

Figure 10:
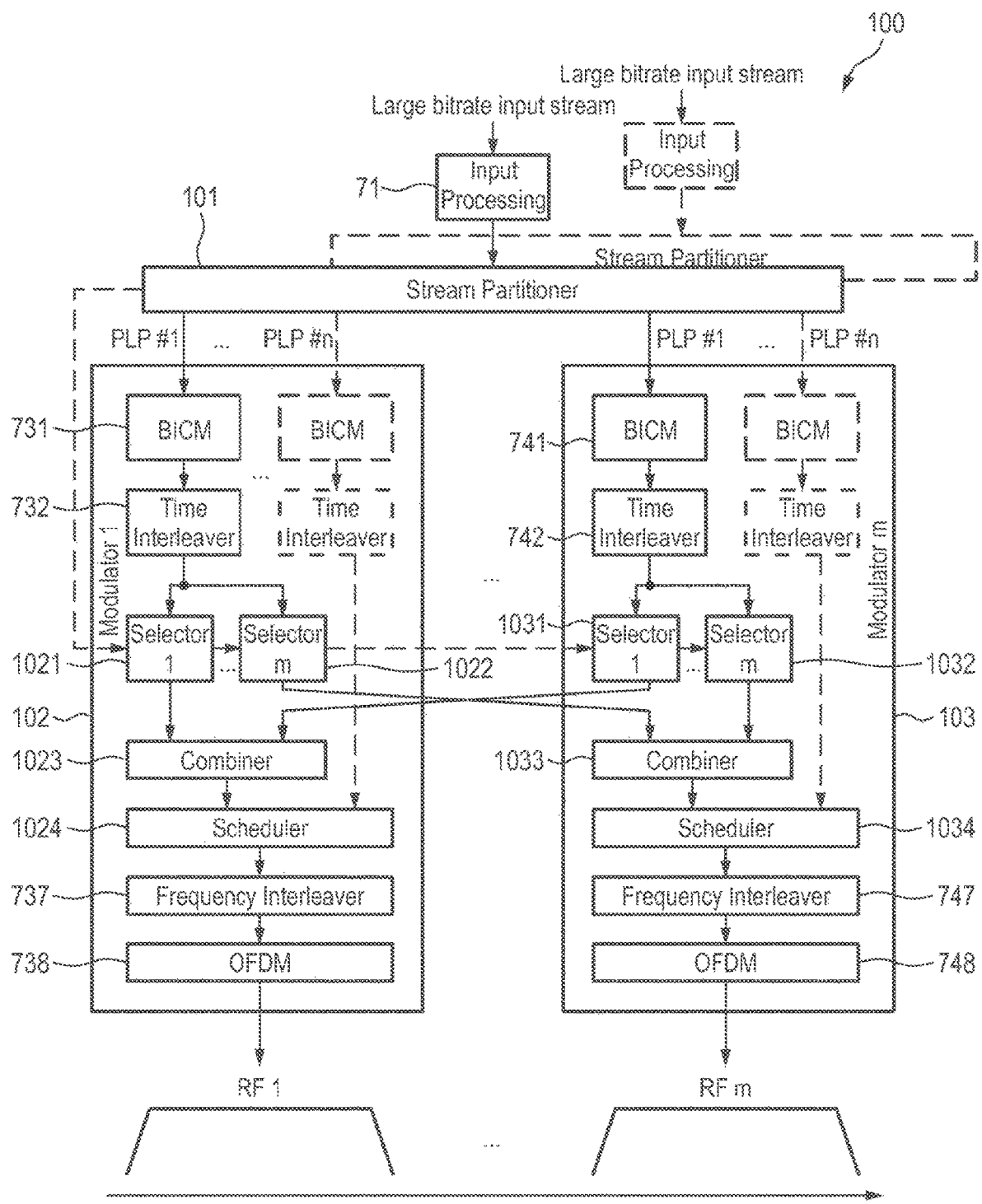
FIG. 10 shows a schematic diagram of the Tx side processing for channel bundling on PLP level.

So far it has been assumed that the spreading takes place on OFDM symbol level. This allows for a simple TX and RX implementation but has some disadvantages. The exchanged data rate of the spread OFDM symbols is quite high, since the whole OFDM symbols need to be exchanged, even though the PLP of interest is only transmitted in a subset of the cells of the OFDM symbols. This disadvantage can be overcome by spreading the cells on PLP level, as depicted in FIG. 10, showing an embodiment 100 of the Tx side processing for channel bundling on PLP level.

The selection of data cells in the different selector blocks 1021, 1022, 1031, 1032 is for example defined by the partitioning rate in the stream partitioner 101, i.e. the relation of the BB Frames for this PLP that are fed into the different modulator chains 102, 103. In this embodiment the schedulers 1024, 1034 are provided after the combiners 1023, 1033.

In this embodiment it is also shown that separate input streams can be handled by separate input processing units and separate stream partitioners. Alternatively, separate input streams may be handled by a common input processing unit 71 and a common stream partitioner 101. The proposed idea can thus be applied to handling separate input streams in parallel as well.

Figure 11:
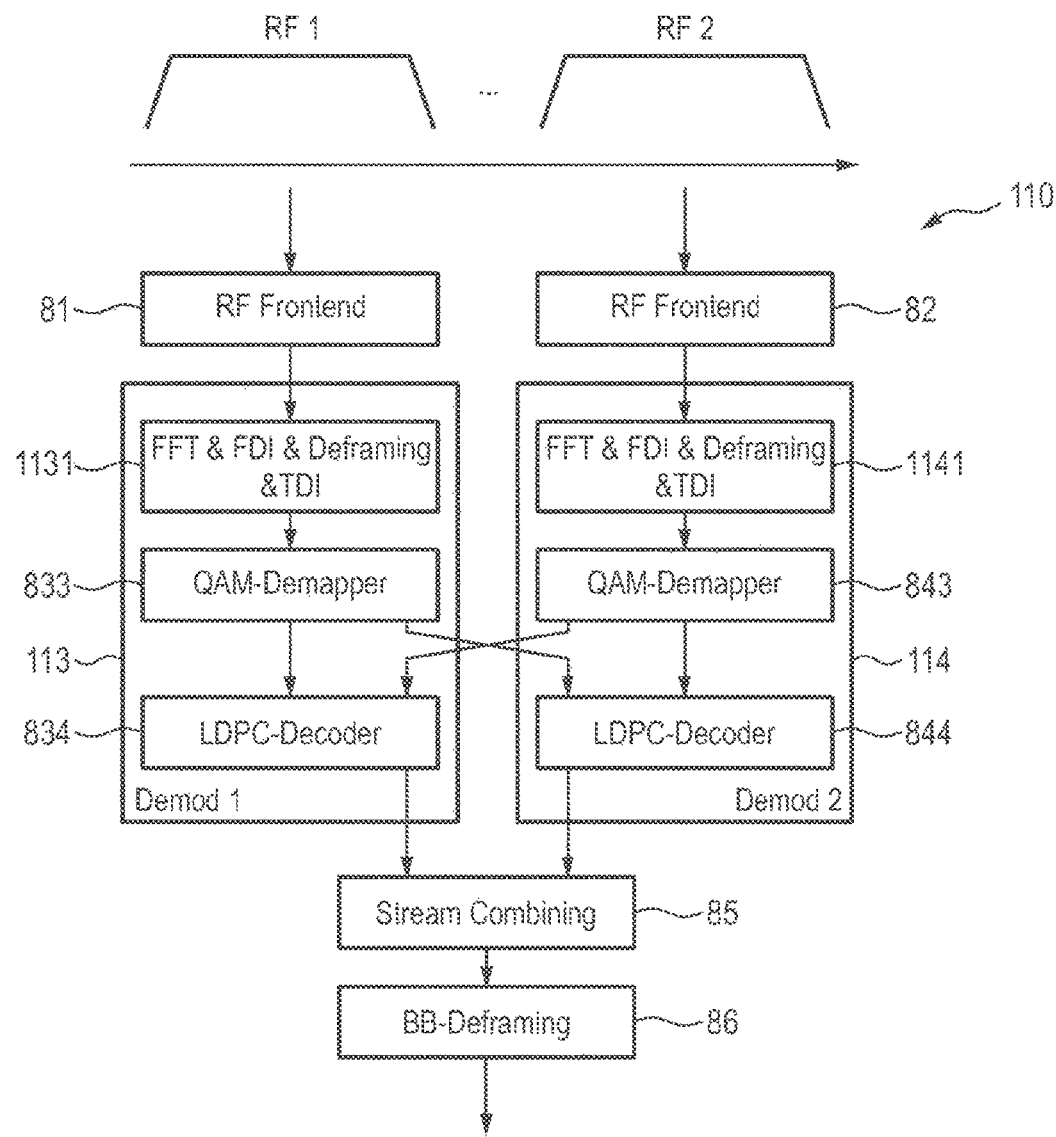
FIG. 11 shows a schematic diagram of the proposed hybrid dual tuner architecture (spreading on PLP level)

The respective receiver architecture 110 is shown in FIG. 11 showing the proposed hybrid dual tuner architecture (spreading on PLP level) comprising two demodulators 113, 114. The demodulators 113, 114 only exchange the LLR values of the QAM demappers 833, 843, resulting in a smaller data rate compared to the exchange of OFDM symbols as provided in the receiver architecture 80 shown in FIG. 8. Note that different possibilities exist for the exchange of data cells on reception side: On top to the illustrated exchange of LLR values after the QAM demappers 833, 843 per bit, it is also possible to exchange I and Q values as well as the channel state information (CSI) by the common units 1131, 1141 for FFT, FDI, demapping and TDI before the QAM demappers 833, 843.

Another advantage of exchanging the data on PLP level is the increased flexibility in case of channel bundling with different RF bandwidths, which leads to different OFDM symbol durations. While there are difficulties exchanging OFDM symbols, due to the different OFDM symbol timing, this causes no problems in case of exchanging cells on PLP level. It should however be ensured that the number of exchanged cells between the different RF channels is adapted according to the capacity of the different channels.

Next, a comparison of channel bundling with SNR averaging with state of the art channel bundling approaches will be made. Example advantages are:
- Relatively simple and scalable implementation
- Reuse of existing tuners and almost completely existing demodulators
- Supports bundling of distant and neighbored channels
- Additional frequency diversity
- TFS-like (time frequency slicing) SNR averaging
- Works for single PLP as well as for multiple PLPs across multiple RF channels Example disadvantages are:
- Requires high data rate interface between demodulator chips (received QAM cells+channel state information or LLR values after QAM demapping for PLP(s) of interest)
- No guard band removal possible for neighboring bundled channels The skilled person will appreciate that in some systems received signals from different reception antennas and tuners are combined into a single decoder chip.

Next, a detailed description of example embodiments of the stream partitioner, the stream combiner and the selector will be provided.

Figure 12:
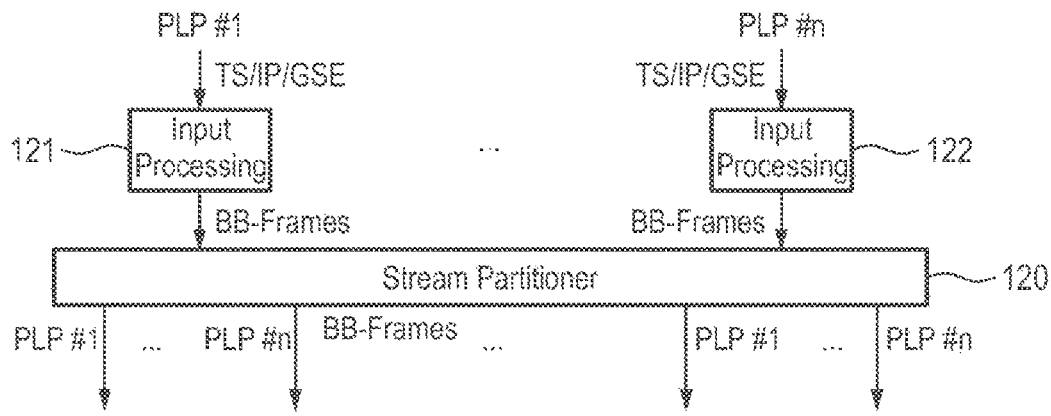
FIG. 12 shows a schematic diagram of the stream partitioner with input and output interfaces.

The input streams of the stream partitioner 120, as depicted in FIG. 12 showing an embodiment of a stream partitioner 120 with input and output interfaces, consist of baseband frames (BB-Frames) of the n different PLPs. Each PLP may have a different input stream format, such as TS, IP or GSE. The corresponding input stream packets are packetized to BB-Frames with a suitable timestamp such as an ISSY timestamp in the input processing blocks 121, 122 before the stream partitioner 120. The task of the stream partitioner 120 is to distribute the BB-Frames of the n PLPs to m streams in such a way, that the output data rate of the streams designated for the m modulators matches the available capacity of the corresponding RF channel. In the simplest case with m=2 modulators with the same capacity, the stream partitioner equally partitions the input streams to both modulators. In case of different transmission parameters or RF channel bandwidths of the m RF channels, the capacity of the m RF channels may however be different, requiring an uneven output stream capacity distribution at the stream partitioner output.

Figure 13:
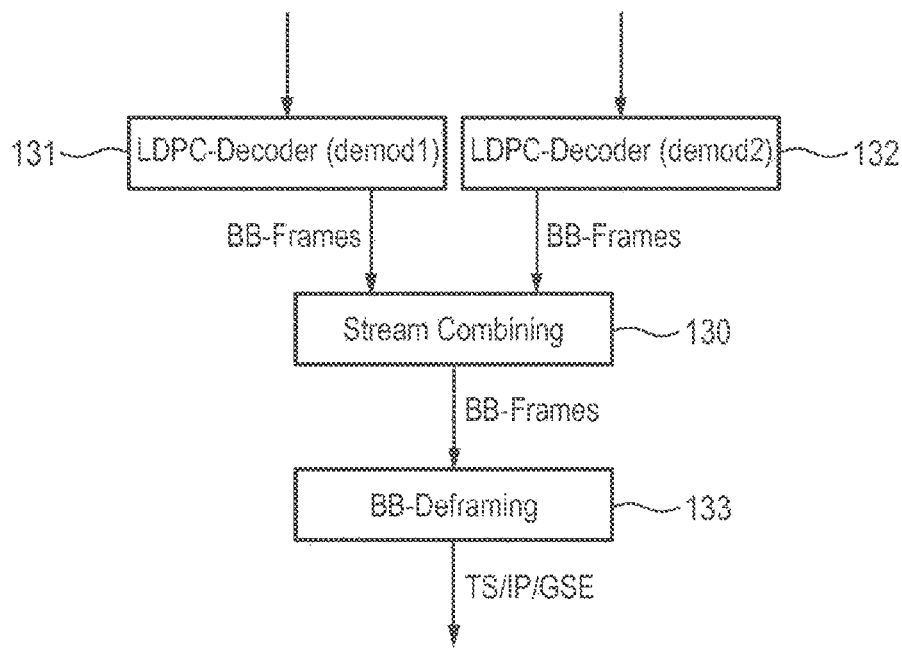
FIG. 13 shows a schematic diagram of the stream combiner for m=2 with input and output interfaces.

The task of the stream combiner 130 in the receiver, depicted in FIG. 13 showing an embodiment of a stream combiner 130 for m=2 with input and output interfaces, is to revert the process of the stream partitioner. For a given PLP that is being decoded the m streams of the m demodulators 131, 132 are joined according to the ISSY timestamps available in the BB-Frames. The stream combiner 130 comprises a buffer to store the BB-Frames from the different streams, whose size depends on the maximum difference decoding delay of the m demodulators. In case of identical decoding delay a buffer size of some BB-Frames is sufficient. The processing of the partitioner and combiner is transparent, i.e. the stream of BB-Frames at the output of the stream combiner 130 is identical to the input of the stream partitioner. After the stream combining the initial TS/IP/GSE stream is restored by the BB deframer 133.

Figure 14:
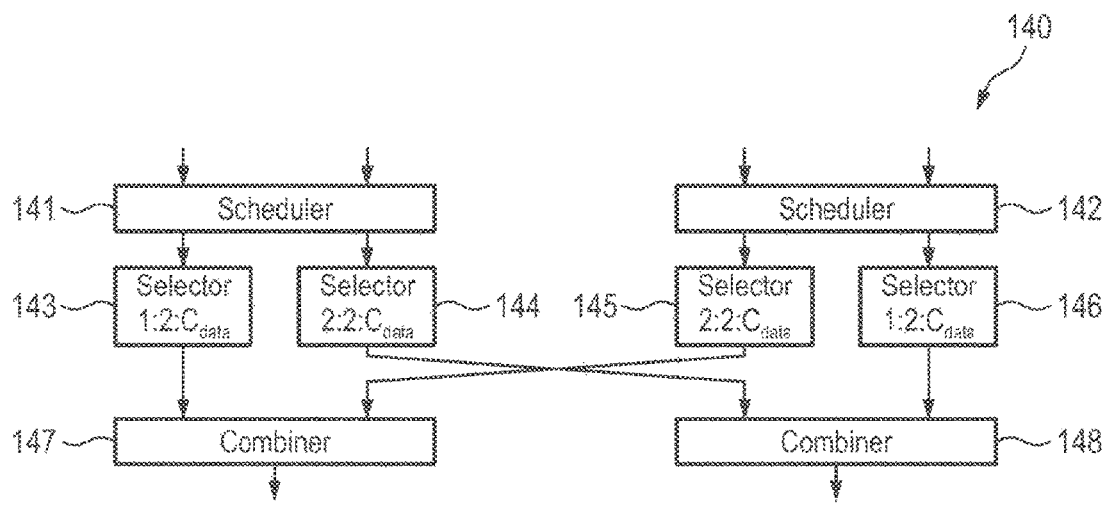
FIG. 14 shows a schematic diagram of the Selector/combiner stage for two RF channels.

The task of the selector and combiner stage 140, depicted in FIG. 14 showing an embodiment of a selector/combiner stage 140 for two RF channels, is to equally distribute the modulated symbols (so called cells in DVB) at the output of the m schedulers 141, 142 across all m RF channels. This way the frequency diversity is increased from the bandwidth of a single channel by a factor of m to the overall bandwidth of all bundled channels. In particular in case of different SNR levels of the RF channels, an SNR averaging takes place across all RF channels. It should be noted that selector(s) 143, 144, 145, 146 provided in each modulator may be implemented as separate selector blocks as e.g. shown in FIG. 9, i.e. one selector block per modulator so that for m modulators each modulator comprises m selector blocks. In another embodiment each modulator comprises a single selector unit performing the functions of the selector blocks. The data received from the selectors 143, 144, 145, 146 are combined by combiners 147, 148.

Figure 15:
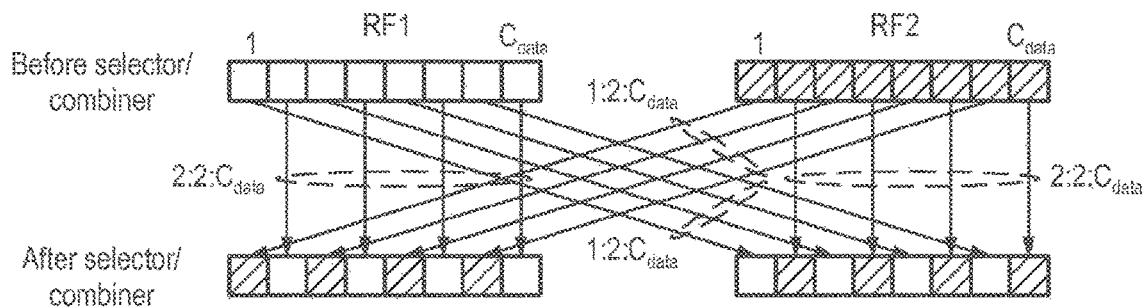
FIG. 15 shows a schematic diagram of an example for exchanging cells of an OFDM symbol in a selector/combiner stage with two RF channels and identical $C_{data}$.
Figure 16:
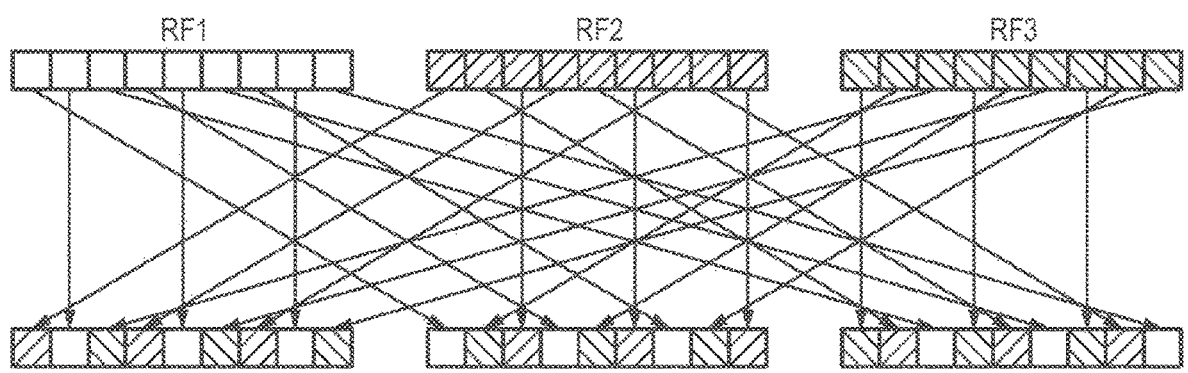
FIG. 16 shows a schematic diagram of an example for exchanging cells of an OFDM symbol between a selector/combiner stage with 3 RF channels and identical $C_{data}$.

The simplest way of applying such a distribution is the exchange of each m-th cell (of all $C_{data}$ cells) of each OFDM symbol between all involved RF channels. For the simplest case of m=2 with the same RF bandwidth (i.e. $C_{data}$ is identical for all RF channels), all cells of the OFDM symbols with even index (index 2:2: $C_{data}$, according to MATLAB syntax) remain in the current RF channel, while all cells of the OFDM symbols with odd index (index 1:2: $C_{data}$, according to MATLAB syntax) are exchanged between both RF channels. The block diagram of such a selector/combiner stage 140 is shown in FIG. 14. The impact to an OFDM symbol is depicted in FIG. 15. FIG. 15 shows an example for exchanging cells of an OFDM symbol in a selector/combiner stage with two RF channels and identical $C_{data}$. A similar example with three RF channels is shown in FIG. 16 showing an example for exchanging cells of an OFDM symbol between a selector/combiner stage with 3 RF channels and identical $C_{data}$.

In the more general case of m RF channels with different bandwidths and hence different OFDM symbol durations and number of cells $C_{data}$, the amount of exchanged cells is not equal and must be calculated according to the ratio of $C_{data}$ of the different RF channels as well as the different OFDM symbol durations. Further, the order of the combining operation of the cells from the different RF channels must be defined. Both numbers have to be defined in a deterministic way using rounding operations to avoid unambiguities between the modulator and demodulator implementation. To ensure a random distribution of the cells per RF channel after the combining stage, a frequency interleaver is applied individually for each RF channel.

Next, the number of required communication links between modulators/demodulators will be discussed.

Figure 17:
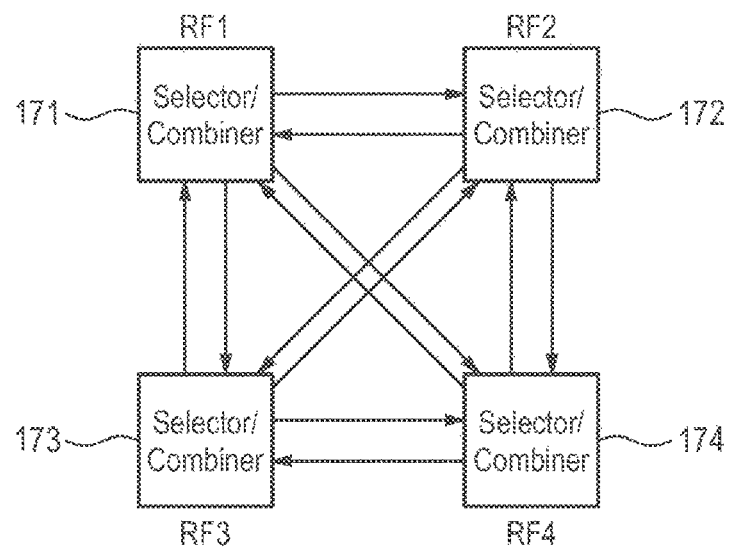
FIG. 17 shows a schematic diagram of two different approaches to interconnect modulators.
Figure 17:
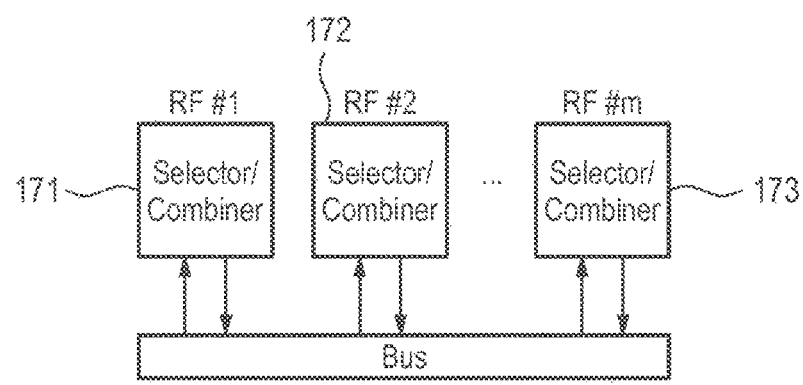

In case of m=2, four unidirectional communication links, or two bidirectional communication links are necessary to exchange the data between the m selector/combiner stages. With increasing number of m, the number of required communication links grows quite fast. This holds for both the transmitter (comprising m modulators) and receiver (comprising m demodulators). To avoid a large number of dedicated transmission links or better logical representation, a communication bus between the m demos may be used. The two approaches of using dedicated links or a communication bus are exemplarily shown in FIG. 17. FIG. 17 shows two different approaches to interconnect several modulators 171, 172, 173, 174 (FIG. 17(a) shows dedicated links, FIG. 17(b) shows a communication bus). The BB-Frame input and output streams of the selector/combiner stages are omitted for simplicity.

Next, channel bundling with single BICM stage will be described.

It will be described briefly how channel bundling is realized with a single BICM encoding and decoding stage (i.e. FEC encoding (BCH/LDPC), bit interleaving and QAM mapping). In contrast to the previous solutions that focus on reusing existing functional blocks or even existing whole demodulator architectures, this option requires that the BICM stages can handle data rates beyond the capacity of a single RF channel, however the architecture for the transmitter and receiver gets more simple.

Figure 18:
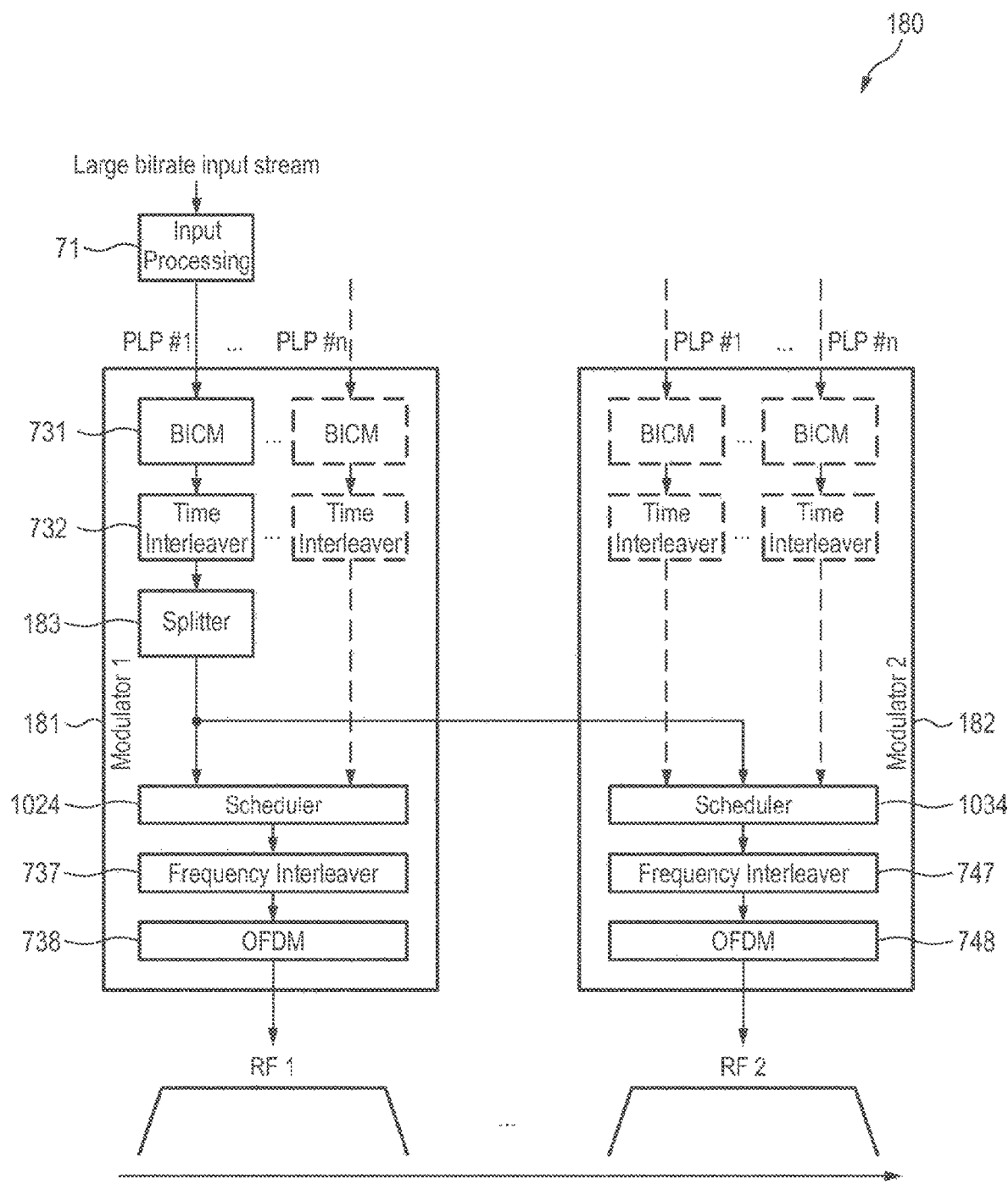
FIG. 18 shows a schematic diagram of channel bundling with single BICM stage.
Figure 19:
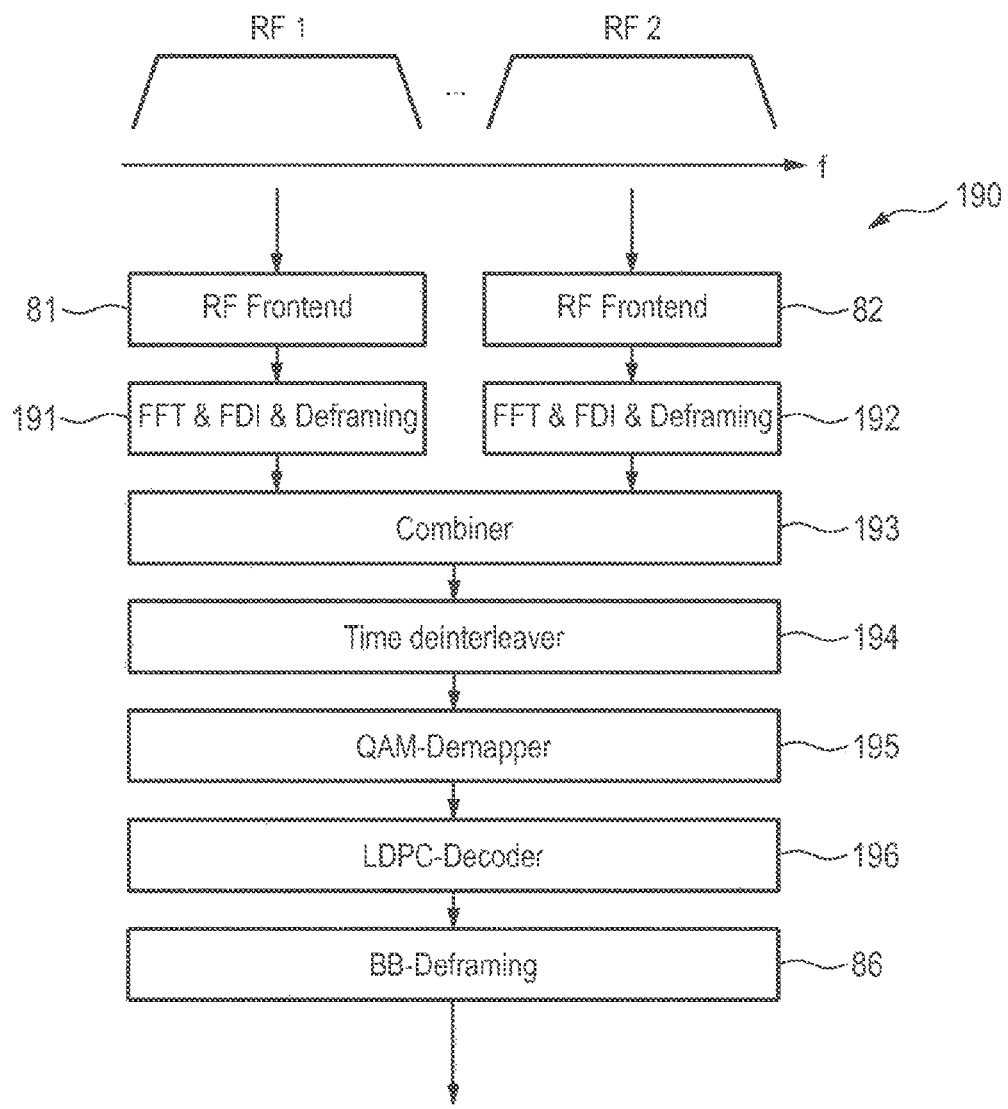
FIG. 19 shows a schematic diagram of a receiver for channel bundling with single BICM stage.

An embodiment of the transmitter side architecture 180 with single BICM stage and multiple bundled RF channels is shown in FIG. 18 for an example configuration of two RF channels. An embodiment of the related receiver block diagram 190 is shown in FIG. 19 for channel bundling with single BICM stage.

The transmitter 180 comprises two modulators 181, 182, wherein the modulator 181 comprises a splitter 183 rather than selectors and a combiner as the provided in the embodiment of the transmitter 100 shown in FIG. 10. Thus, rather than using the same complete BICM chain another option is provided: If the splitter is located after the same FEC (LDPC) encoder, every partial bitstream into the different modulator chains can be modulated by separate QAM modulators and allow therefore for different robustness levels on the different RF channels. On receiver side the combination then takes place after passing separate QAM demappers. For this purpose the receiver 190 comprises separate frontends 81, 82, separate units 191, 192 for FFT, FDI and deframing and a single combiner 193, a single time deinterleaver 194, a single QAM demapper 195, a single LDPC decoder 196 and a single deframing unit 86.

Next, the generic architecture for multiple PLP and the relation to time frequency slicing will be described.

Figure 20:
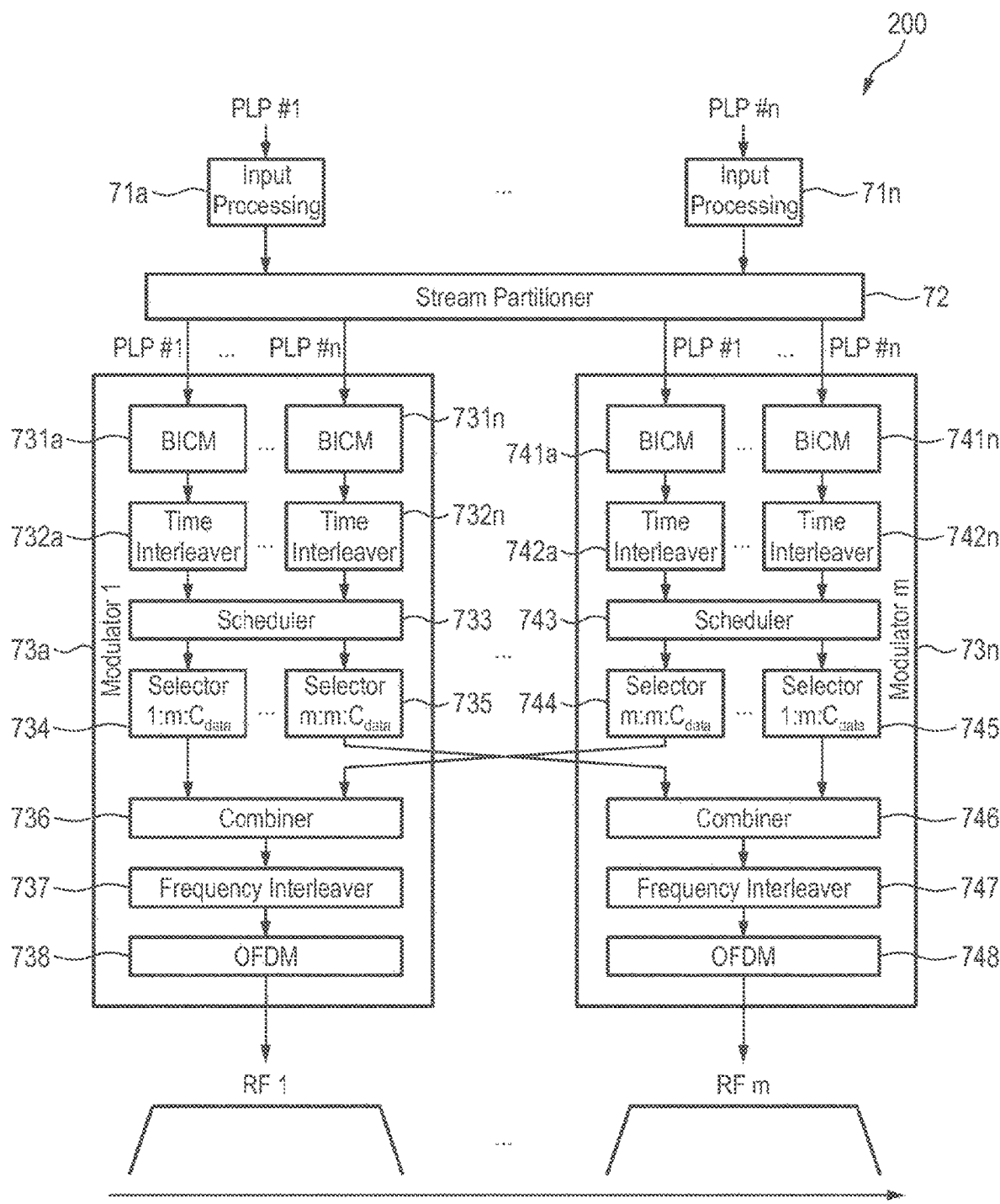
FIG. 20 shows a schematic diagram of an architecture for channel bundling with multiple PLPs.

A proposed enhancement focuses on channel bundling for very high data rate single PLPs. However, in general the exchange of the subcarriers from different encoding chains is also applicable to a multiple PLP scenario. Of course mixed scenario with a high data rate PLP allocating almost the overall capacity and other PLPs to fill the remaining capacity are possible. The Tx structure for M-PLP with n PLPs and m RF channels is shown in FIG. 20 depicting a transmitter architecture 200 for channel bundling with multiple (i.e. n) PLPs. Compared to the transmitter architecture 70 shown in FIG. 7 n input processing units 71a, ..., 71n are provided for separate input processing of the n PLPs. Further, each of the m modulators 73a, ..., 73m comprises n BICM units 731a, ..., 731n and 741a, ..., 741n, n time interleavers 732a, ..., 732n and 742a, ..., 742n, a scheduler 733, 743, selectors 734, 735, 744, 745, a combiner 736, 746, a frequency interleaver 737, 747 and an OFDM modulator 738, 748.

Instead of the cell exchange stage and following RF channel frequency interleaver, a single frequency interleaver spanning across the resulting bandwidth of all RF channels can be used, obviously still requiring an interface between the m modulators. This is shown in FIG. 21 depicting a transmitter architecture 210 for channel bundling with multiple PLPs using one broadband frequency interleaver 212 for all modulators 211a, ..., 211n and separate input processing units 213a, ..., 213n, 214a, ..., 214n for each PLP in said modulators 211a, ..., 211n.

Figure 22:
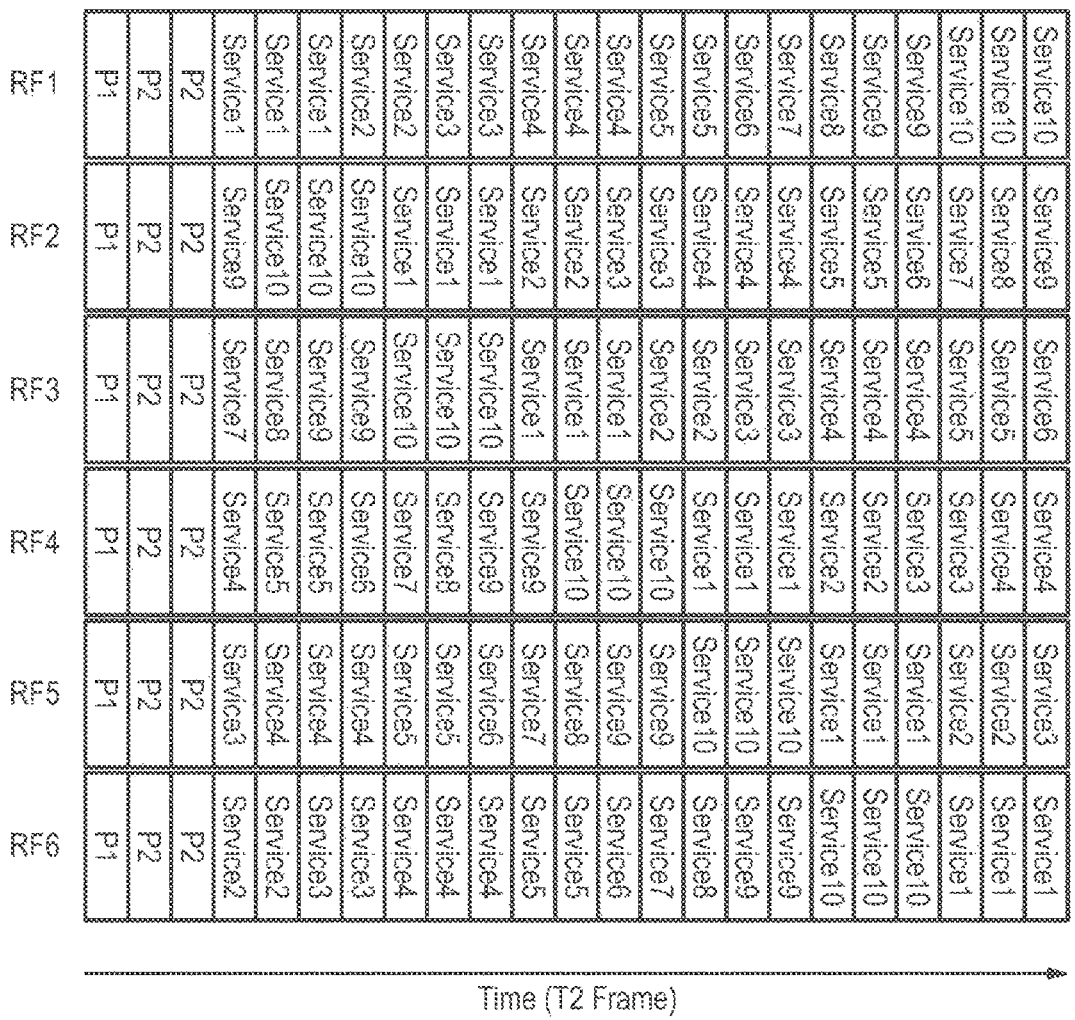
FIG. 22 shows a schematic diagram of the basic TFS mechanism in terrestrial broadcast systems.

One drawback of the proposed channel bundling approach is the mandatory usage of several tuners. It should be mentioned that there is another proposal in DVB and ATSC3.0 that allows for a single tuner reception of several RF channels, the so called "Time Frequency Slicing (TFS)". TFS also spreads data from different PLPs to different RF channels (up to 6 frequencies) to make a single 'virtual' channel to allow for efficient statistical multiplexing. PLPs are scheduled that they appear only at one RF channel at one point of time. Some guard band between different PLP portions on different RF channels is provided to enable channel change. FIG. 22 shows the basic TFS mechanism in terrestrial broadcast systems (DVB, ATSC3.0).

Figure 23:
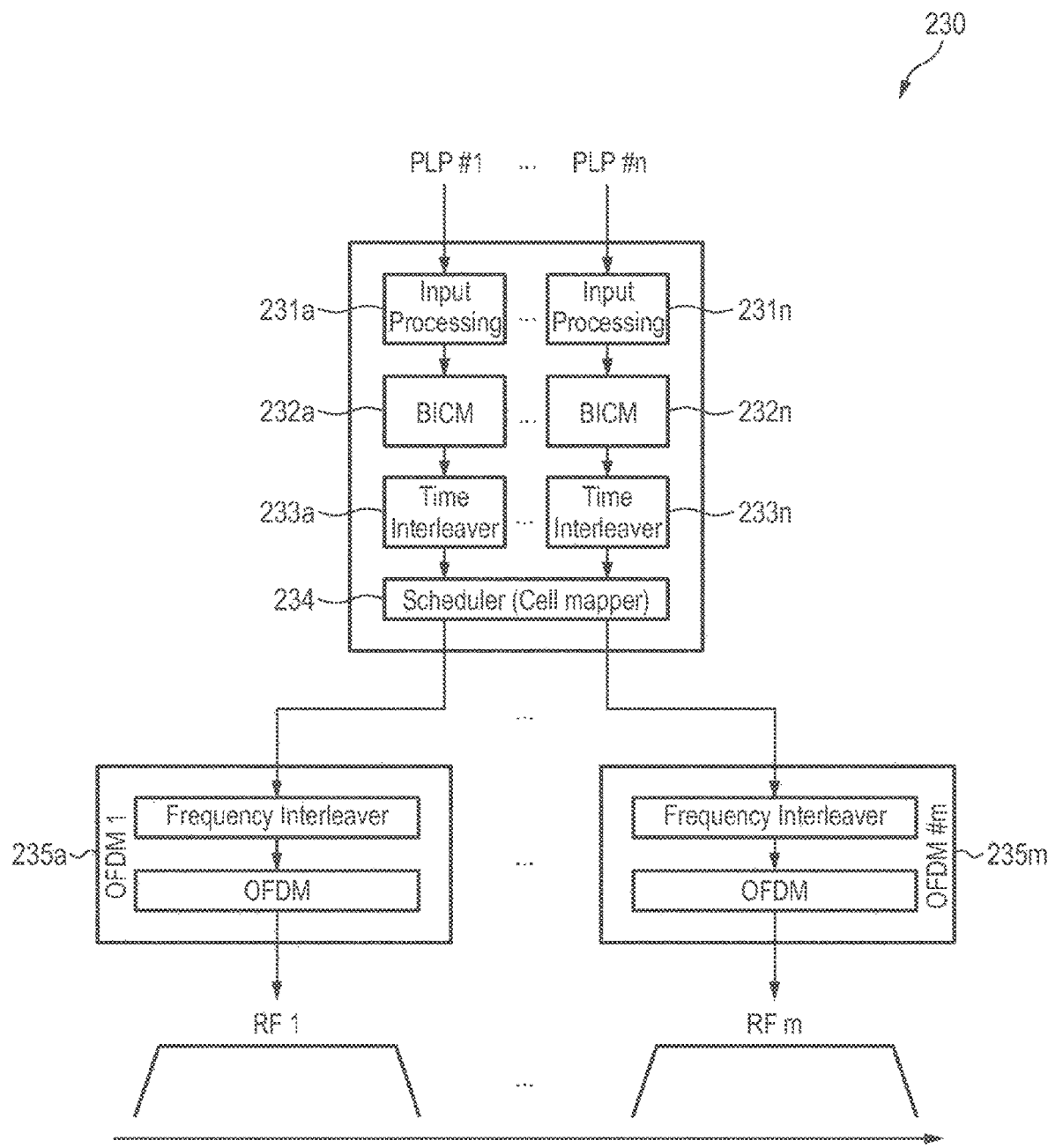
FIG. 23 shows a schematic diagram of a Tx architecture for TFS.

However, there are also drawbacks and constraints in using TFS, such as the mandatory usage of a sufficient number of PLPs to allow for enough time for RF channel hopping. Moreover it is not possible that a PLP allocates the majority of the available capacity as this would not allow to have this PLP scheduled to a single RF channel at all possible times. This results in constraints regarding the maximum capacity of one PLP, which is significantly below the capacity of a single RF channel. FIG. 23 shows a Tx architecture 230 for TFS which may be compared to the Tx architecture 180 for channel bundling shown in FIG. 18. This transmitter 230 comprises n processing chains for processing the n PLPs, each processing chain comprises an input processing unit 231a, ..., 231n, a BICM 232a, ..., 232n and a time interleaver 233a, ..., 233n. Further, a common scheduler 234 is provided. The output of the scheduler 234 is provided to m separate OFDM units 235a, ..., 235m, each including a frequency interleaver and an OFDM modulator.

Generally speaking TFS cannot transmit at data rates above the capacity of a single channel. This is extended by channel bundling, using for example the methods and apparatus described.

In other embodiments of the present disclosure, the proposed transmitter and receiver architecture is used and may be embodied as a unified architecture, in other scenarios in which two tuners are used in the receiver architecture. Such other scenarios include—in addition to the above explained scenario using channel bundling (also called channel bonding)—MIMO architectures and MRC (Maximum Ratio Combining) architectures used in diversity receivers. This does not preclude use adaptation for other scenarios. In some embodiments, standard blocks from a standard SISO receiver, including BICM stages, shall be reused. The proposed architectures use a joint processing/cell exchange stage across two (or more) transmitter modules and across two (or more) receiver modules, respectively. The proposed architectures provide the advantages of a lower implementation and development effort, lower costs because of reused blocks and therefore higher success chances in the market.

It should be noted that LDPC decoders as most complex elements of the receiver are implemented in parallel structures: Logically two separate LDPC decoders with processing speed x could be also handled by a single LDPC decoder operated at processing speed 2x. In other words: Implementing with two standard speed LDPC decoders or double speed single decoder is functionally equivalent.

Figure 24:
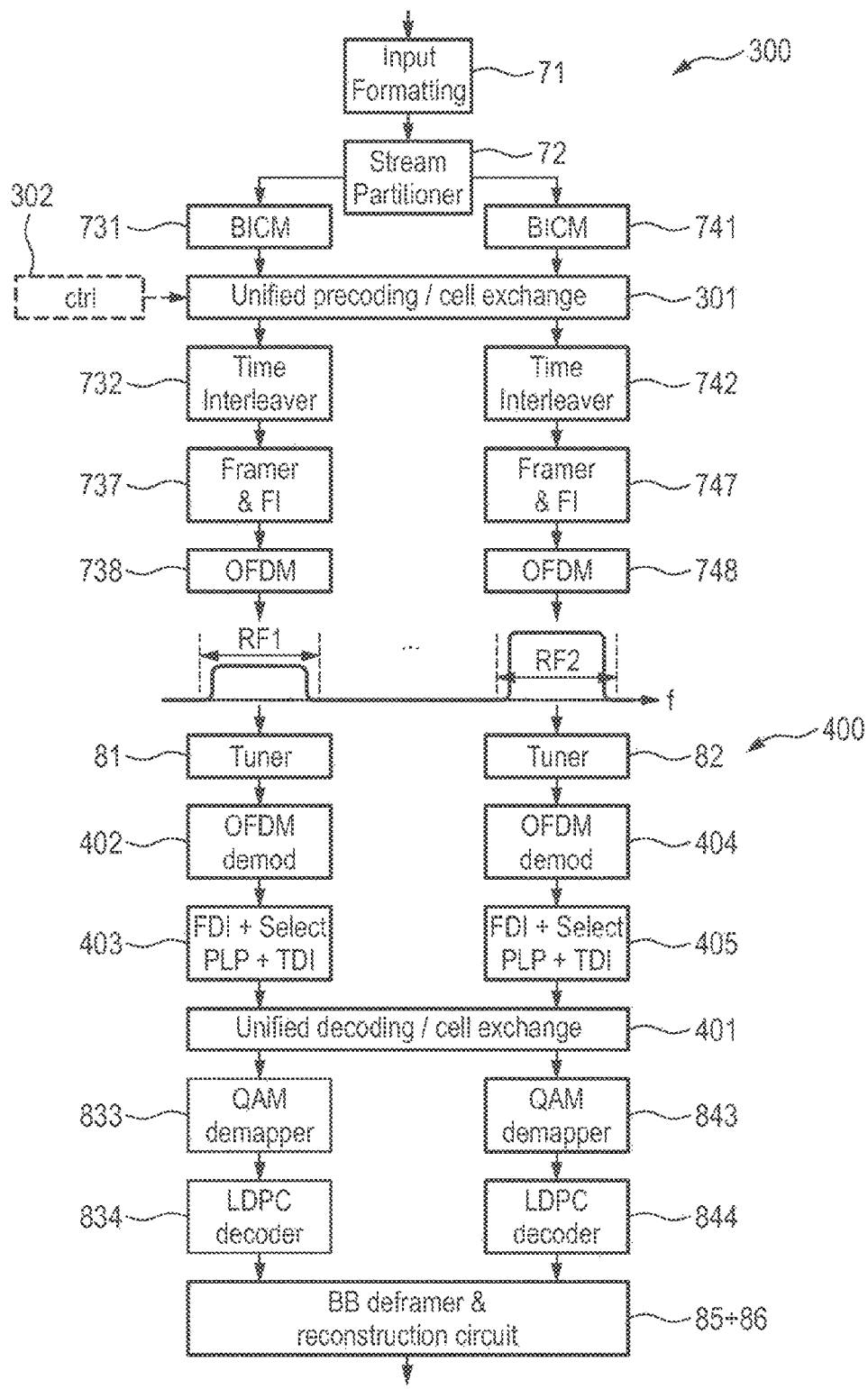
FIG. 24 shows a schematic diagram of a common transmitter and receiver architecture for use in different modes.

A common architecture of a transmitter 300 and of a receiver 400 is shown in FIG. 24. Elements that are already explained above with reference to other embodiments will be provided with the same reference numerals as in those other embodiments. In the transmitter 300, a unified precoding and cell exchange unit 301 is provided; in the receiver 400 a unified decoding and cell re-exchange unit 401 is provided. Further, in the receiver 400 OFDM demodulators 402, 404 and common units 403, 405 for FDI, PLP selection and TDI are provided.

As can be derived from the schematic diagram, the processing will be made on symbol level (e.g. on the level of QAM symbols), which is common to all applications of this common architecture. Further, an interface for requesting and/or obtaining redundancy data (e.g. redundancy data on demand via a separate channel) may be provided based on the same processing level.

Since the transmitter can be operated in different modes (i.e. MRC mode, MIMO mode and channel bonding mode) a control unit 302 is provided in some embodiments to control the unified precoding and cell exchange unit 301 accordingly to work in the desired mode. This control unit 302 may be operated by the operator of the transmitter. The control unit may select MIMO operation for a certain RF channel if the transmitter is equipped with several antennas or may operate in channel bonding mode for other two RF frequencies. The operation may depend on the network design and anticipated receiver capabilities and are selected by the network operator. Further, some signaling is included into the transmitted data streams identifying the respective mode in which the transmitter 300 is operated for use by the receiver 400 so that the receiver 400 can operate the unified decoding and cell re-exchange unit 401 in the same mode. The signaling may be embedded for example in layer 1 signaling which may be carried in a preamble or signaling symbols at the beginning of each frame defining the mode of operation and is used by the receiver to decode the following data part depending of the mode of operation.

Figure 25:
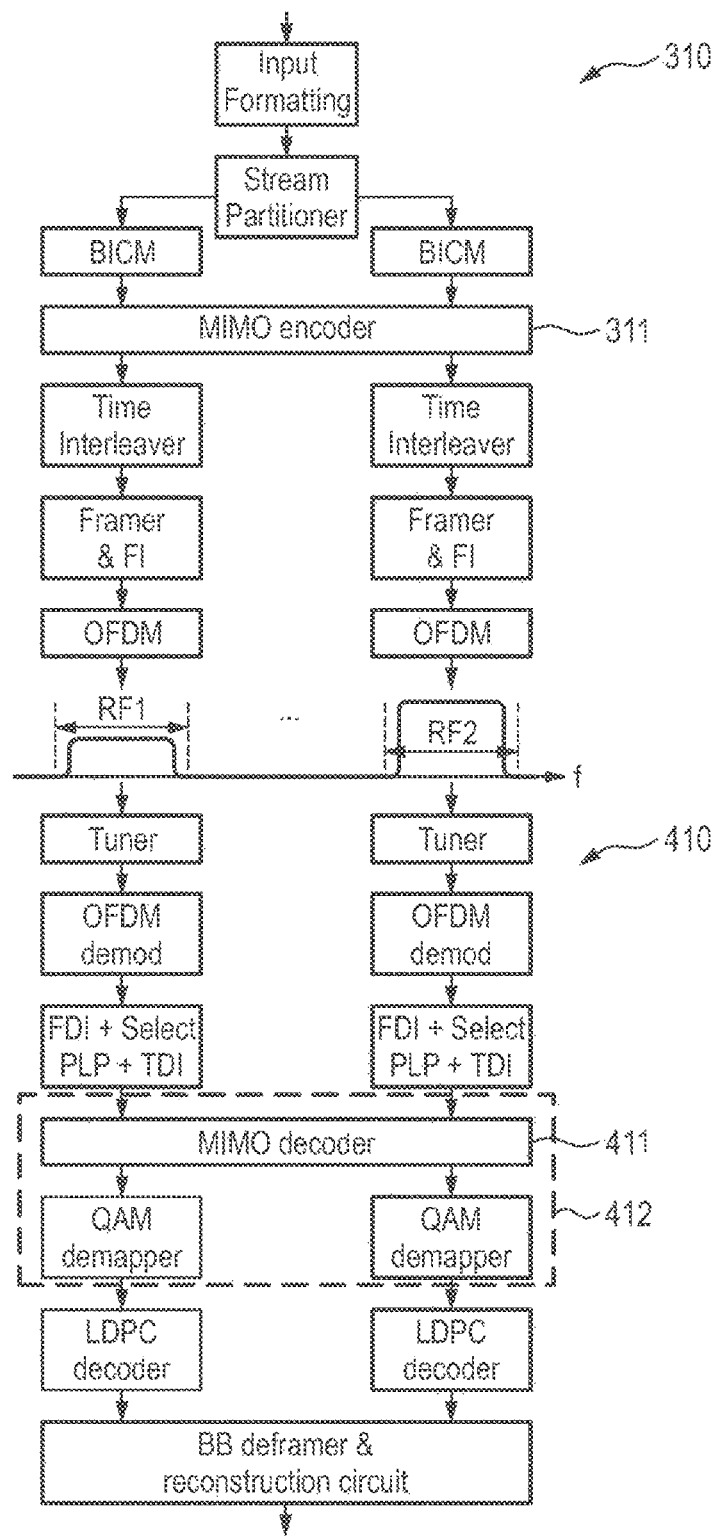
FIG. 25 shows a schematic diagram of the common transmitter and receiver architecture in MIMO mode.

FIG. 25 shows the transmitter 310, corresponding to transmitter 300, and the receiver 410, corresponding to receiver 400, when operated in the MIMO mode. In this case the unified precoding and cell exchange unit 301 functions as MIMO encoder 311 and the unified decoding and cell re-exchange unit 401 functions as MIMO decoder 411.

In the MIMO encoder 311 a linear precoding matrix may be used. Further, a different precoding matrix may be applied per subcarrier k. The precoding may use eSM (enhanced Spatial Multiplexing) and PH (Phase Hopping) which may have the following precoding matrix per subcarrier k $$V(k) = \begin{bmatrix} 1 & 0 \\ 0 & e^{j\theta(k)} \end{bmatrix} \begin{bmatrix} \cos\psi & \sin\psi \\ -\sin\psi & \cos\psi \end{bmatrix}$$

Additional precoding elements, like power allocation or stream-based phase hopping may be used additionally. Precoding at the transmitter increases diversity and improves the overall system performance. In another embodiment plain spatial multiplexing may be applied with $$V(k) = \begin{bmatrix} 1 & 0 \\ 0 & 1 \end{bmatrix}$$

In this case, no precoding is applied and the precoder can be considered to be transparent.

The RF channels RF1 and RF2 are defined in the spatial domain, and the two tuners are connected to two antennas For performing MIMO transmission at least two transmit antennas and at least two receive antennas are provided, i.e. a first transmit antenna transmits data on RF1 and a second transmit antenna transmits data on RF2. There may be interference between the transmit antennas and the receive antennas. The channel matrix may be represented as $$H = \begin{bmatrix} h_{11} & h_{12} \\ h_{21} & h_{22} \end{bmatrix}$$

In the receiver 410 ZF (Zero Forcing) or MMSE (Minimum Mean Square Error) detection may be used for decoupling the two received data streams. Alternatively, a ML (Maximum Likelihood) demapper may be used, for example a joint MIMO decoder and QAM demapper 412.

Figure 26:
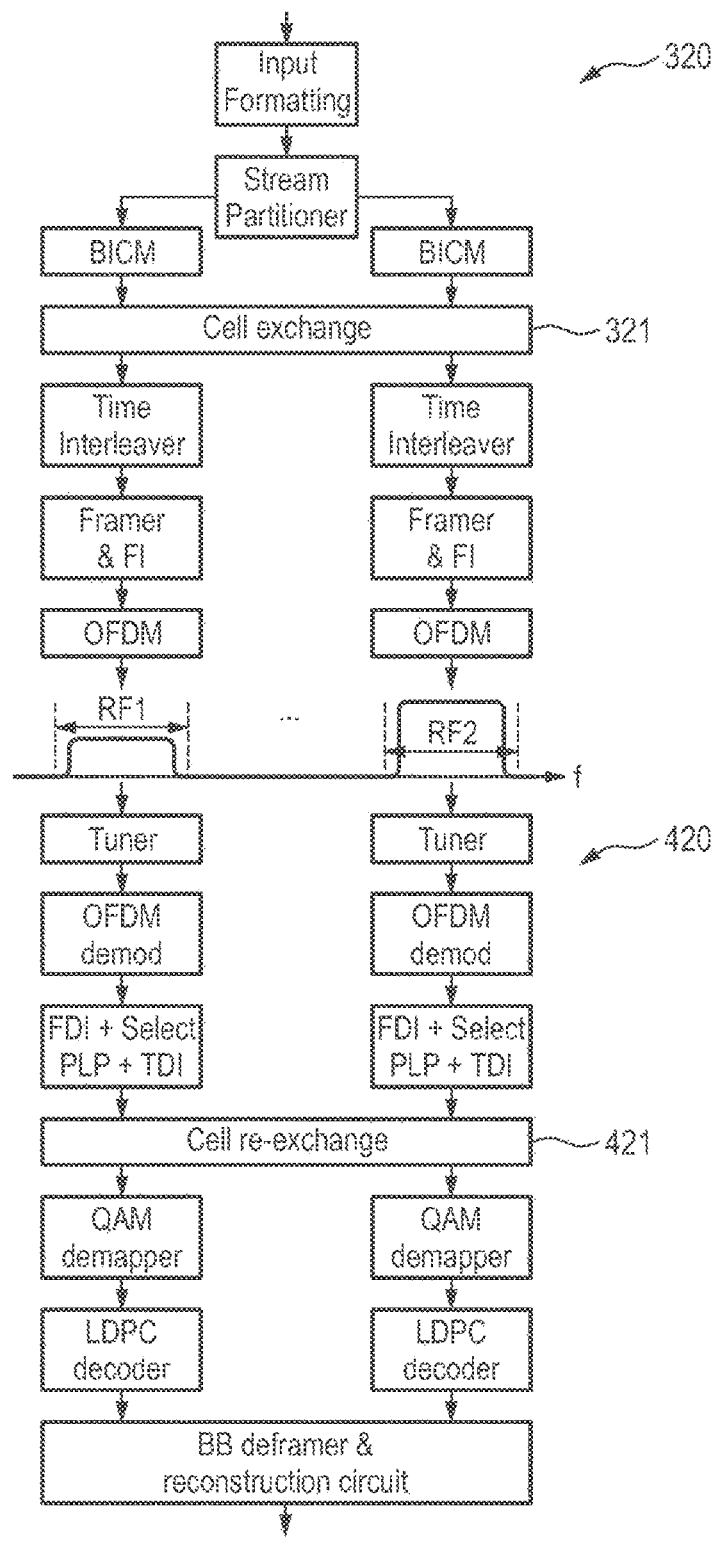
FIG. 26 shows a schematic diagram of the common transmitter and receiver architecture in channel bonding mode.

FIG. 26 shows the transmitter 320, corresponding to transmitter 300, and the receiver 420, corresponding to receiver 400, when operated in the channel bonding mode. In this case the unified precoding and cell exchange unit 301 functions as cell exchange unit 321, representing another embodiment of the disclosed interleaver, and the unified decoding and cell re-exchange unit 401 functions as cell re-exchange unit 421, representing another embodiment of the disclosed deinterleaver. This case may also be seen functionally as a subset of the MIMO case.

In the cell exchange unit 321 SNR averaging may be described in matrix notation to highlight the analogy to the MIMO description $$V(\text{even}) = \begin{bmatrix} 1 & 0 \\ 0 & 1 \end{bmatrix} \text{ and } V(\text{odd}) = \begin{bmatrix} 0 & 1 \\ 1 & 0 \end{bmatrix}.$$

Hereby, even and odd refer to OFDM carrier numbers, but could also map to other granularities (OFDM symbols, . . . ). In another embodiment any precoding (similar to MIMO) may be applied providing increased diversity. However, unitary precoding, similar to the MIMO precoding described above, is preferred, but not essential to the disclosure. Compared to the simple cell exchange described by the matrices above, precoding further improves the performance. If the precoding block is already available for the MIMO operation mode, the precoding block may be used for the channel bonding mode without additional complexity. The improved performance by applying precoding may be explained as follows: precoding overlaps the two symbols generated by the two BICM chains, i.e. a superposition of both symbols is transmitted in each RF channel. If the two RF channels experience very different fading or attenuation, the information of the two symbols may be recovered more reliably at the receiver (in an extreme scenario, the information of both symbols may be recovered from only RF channel; if no precoding is applied, the second symbol may be lost if one the two RF channels is attenuated very strongly).

The RF channels RF1 and RF2 are described in the frequency domain. There is no co-channel interference. The channel matrix may be represented as $$H = \begin{bmatrix} h_{11} & 0 \\ 0 & h_{22} \end{bmatrix}$$

where h11 and h22 correspond to the fading coefficients of the RF channels RF1 and RF2, respectively. This description is intended to highlight the analogy to the MIMO mode above.

In the receiver 420 cell re-exchange is performed, e.g. by use of reordering of SNR averaging or inverse precoding.

Figure 27:
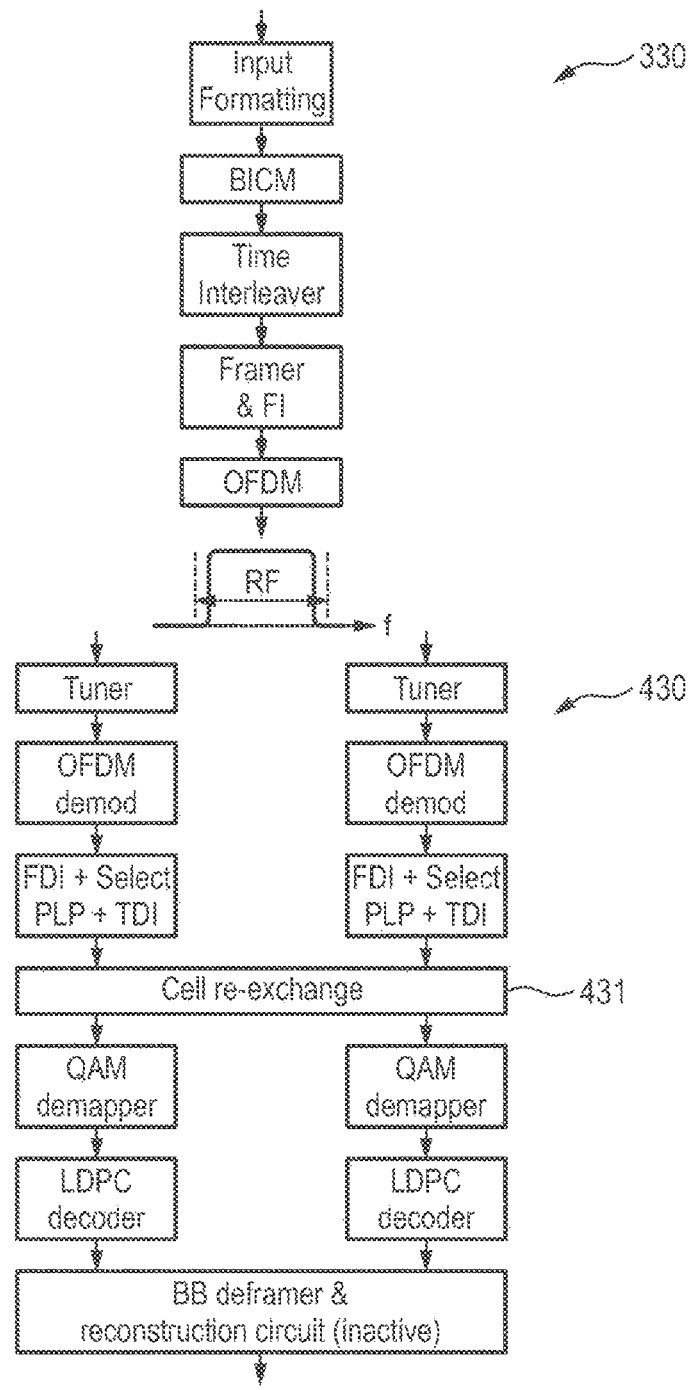
FIG. 27 shows a schematic diagram of the common transmitter and receiver architecture in MRC mode.

FIG. 27 shows the transmitter 330, corresponding to transmitter 300, and the receiver 430, corresponding to receiver 400, when operated in the MRC combining mode providing a diversity receiver. In this case the transmitter 330 uses only a single path (modulator), i.e. there is only a single data stream processed. The unified precoding and cell exchange unit 301 is disabled. In the receiver the unified decoding and cell re-exchange unit 401 functions as cell re-exchange unit 431 (representing still another embodiment of the disclosed deinterleaver), but issues a single data stream as well so that only one path after the cell re-exchange unit 431 is activated. This case may also be seen as a subset of the MIMO case.

The RF channel between the transmission path and each receiving path may be represented as $$H = \begin{bmatrix} h_{11} & 0 \\ h_{21} & 0 \end{bmatrix}$$

In the receiver 430 maximum ratio combining may be performed, e.g. by use of coherent addition of the two received signals following the algorithm of maximum ratio combining (MRC). More advanced combing algorithms may be used as well, e.g. optimum combining.

In summary, in the combined transmitter and receiver architecture explained above with reference to FIGS. 24 to 27 the transmitter and the receiver, respectively, may generally be defined as follows:

A transmitter for communicating data using at least two separate RF channels, the transmitter comprising:
 a data stream partitioner configured to partition a data stream of data to be communicated into two or more stream partitions,
 two or more modulators configured to each receive a stream partition and to generate modulated data from the received stream partition,
 a unified precoding and cell exchange unit configured to operate in different modes, and
 an optional controller configured to control the unified precoding and cell exchange unit to operate in a desired mode.
Said modes may include i) a MIMO mode in which it operates to separately encode the two or more stream partitions, ii) a channel bonding mode in which it operates to assign the modulated data generated by a modulator from a received stream partition to different RF channels for transmission, and iii) an MRC mode in which the data stream partitioner and the unified precoding and cell exchange unit are disabled and in which only one modulator operates.

A receiver for receiving data of a data stream via at least two separate RF channels (which may be separate in frequency (channel bonding) or achieved by spatial or polarization diversity), the receiver comprising:
 means for deriving a mode information from the received data,
 a unified decoding and cell re-exchange unit configured to operate in one of different modes according to the derived mode information,
 two or more demodulators configured to each receive data of a stream partition and to generate demodulated data from the received data of the stream partition, and
 a data stream combiner configured to combine the demodulated data of the two or more demodulators into the data stream.
Said modes may include i) a MIMO mode in which it operates to separately decode data of two or more stream partitions received via at least two separate antennas, ii) a channel bonding mode in which it operates to receive data of a data stream via at least two separate RF channels, wherein the data of stream partitions of the data stream are transmitted via the at least two RF channels, and to assign the data belonging to the same stream partition transmitted via different RF channels to different demodulators, and iii) an MRC mode in which only one demodulator is activated to demodulate the received data.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A transmitter for communicating data using at least two separate RF channels, the transmitter comprising:
    a data stream partitioner configured to partition a data stream of data to be communicated into two or more stream partitions,
    two or more modulators configured to each receive a stream partition and to generate modulated data from the received stream partition, and
    an interleaver configured to assign the modulated data generated by a modulator from a received stream partition to different RF channels for transmission.

2. The transmitter as defined in embodiment 1,
wherein said data stream partitioner is configured to partition the data stream into N stream partitions and
wherein the transmitter comprises N modulators, each being configured to receive a single stream partition.

3. The transmitter as defined in embodiment 1 or 2,
wherein said data stream partitioner is configured to receive at least two data streams of data to be communicated and to partition said data streams into two or more respective stream partitions and
wherein said two or more modulators are configured to each receive at least one stream partition from at least two different data streams.

4. The transmitter as defined in embodiment 3,
wherein said two or more modulators are configured to each receive one stream partition from each data stream.

5. The transmitter as defined in embodiment 3,
wherein said interleaver further comprises a combiner configured to combine modulated data generated by different modulators from different stream partitions of the same data stream and assigned for transmission by the same RF channel.

6. The transmitter as defined in any preceding embodiment,
wherein said transmitter is configured to communicate the data on OFDM subcarriers of OFDM symbols and wherein said interleaver is configured to assign the modulated data to OFDM subcarriers of OFDM symbols of different RF channels for transmission.

7. The transmitter as defined in any preceding embodiment,
wherein said two or more modulators are configured to each generate OFDM symbols comprising a plurality of cells from the received stream partition and
wherein said interleaver is configured to assign the OFDM symbols or cells of OFDM symbols generated by a modulator from a received stream partition to different RF channels for transmission.

8. The transmitter as defined in any preceding embodiment,
wherein said interleaver comprises
    a selector per modulator configured to select and assign modulated data of the respective modulator to the different RF channels,
    a combiner per RF channel configured to combine modulated data assigned to the respective RF channel, and
    a frequency interleaver per RF channel for frequency interleaving of the combined modulated data of the respective RF channel.

9. The transmitter as defined in any preceding embodiment,
wherein said data stream partitioner is configured to equally partition a data stream of data to be communicated into two or more stream partitions.

10. The transmitter as defined in any preceding embodiment,
wherein said interleaver is configured to equally assign the modulated data to different RF channels for transmission.

11. The transmitter as defined in any preceding embodiment,
wherein said interleaver is configured to assign the modulated data to different RF channels for transmission proportional to the bandwidth of the different RF channels.

12. The transmitter as defined in any preceding embodiment,
wherein said interleaver comprises cell exchange circuitry.

13. The transmitter as defined in embodiment 12,
wherein said cell exchange circuitry is configured to operate in different modes.

14. The transmitter as defined in embodiment 12 or 13,
wherein said cell exchange circuitry is configured to operate in a channel bonding mode in which it operates to assign the modulated data generated by a modulator from a received stream partition to different RF channels for transmission.

15. The transmitter as defined in embodiment 12, 13 or 14,
wherein said cell exchange circuitry is configured to apply a matrix V(even) for multiplication with an input vector of two OFDM carriers or symbols or cells of even index from two different stream partitions and a matrix V(odd) for multiplication with an input vector of two OFDM carriers or symbols or cells of odd index from two different stream partitions, wherein $$V(\text{even}) = \begin{bmatrix} 1 & 0 \\ 0 & 1 \end{bmatrix} \text{ and } V(\text{odd}) = \begin{bmatrix} 0 & 1 \\ 1 & 0 \end{bmatrix}.$$

16. A transmission method for communicating data using at least two separate RF channels, the transmission method comprising:
    partitioning a data stream of data to be communicated into two or more stream partitions,
    receiving a stream partition by each of two or more modulators,
    generating modulated data from the received stream partition, and
    assigning the modulated data generated by a modulator from a received stream partition to different RF channels for transmission 17. A receiver for receiving data of a data stream via at least two separate RF channels, the receiver comprising:
    a deinterleaver configured to receive data of a data stream via at least two separate RF channels, wherein the data of stream partitions of the data stream are transmitted via the at least two RF channels, and to assign the data belonging to the same stream partition transmitted via different RF channels to different demodulators,
    two or more demodulators configured to each receive data of a stream partition and to generate demodulated data from the received data of the stream partition,
    a data stream combiner configured to combine the demodulated data of the two or more demodulators into the data stream.

18. The receiver as defined in embodiment 17,
wherein the receiver comprises N demodulators, each being configured to receive data from N stream partitions, and
wherein said data stream combiner is configured to combine the demodulated data from the N demodulators into the data stream.

19. The receiver as defined in embodiment 17 or 18, wherein said deinterleaver is configured to assign OFDM symbols or OFDM subcarriers of OFDM symbols belonging to the same stream partition transmitted via different RF channels to different demodulators.

20. The receiver as defined in any one of embodiments 17 to 19, further comprising a demapper for demapping of the received data, wherein said deinterleaver is configured to assign channel state information before demapping and/or either LLR values of the demapped data or I and Q values of the data before demapping belonging to the same stream partition transmitted via different RF channels to different demodulators.

21. The receiver as defined in any one of embodiments 17 to 20, wherein said receiver is configured to receive the data on OFDM subcarriers of OFDM symbols and wherein said deinterleaver is configured to assign the received data from OFDM subcarriers of OFDM symbols or from OFDM symbols transmitted via different RF channels to different demodulators.

22. The receiver defined in any one of embodiments 17 to 21, wherein said deinterleaver comprises cell re-exchange circuitry.

23. The receiver as defined in embodiment 22, wherein said cell re-exchange circuitry is configured to operate in different modes.

24. The receiver as defined in embodiment claim 22 or 23, wherein said cell re-exchange circuitry is configured to operate in a channel bonding mode in which it operates to assign the data belonging to the same stream partition transmitted via different RF channels to different demodulators.

25. A receiving method for receiving data of a data stream via at least two separate RF channels, the receiving method comprising:
   receiving data of a data stream via at least two separate RF channels, wherein the data of stream partitions of the data stream are transmitted via the at least two RF channels,
   assigning the data belonging to the same stream partition transmitted via different RF channels to different demodulators,
   receiving data of a stream partition by each of two or more demodulators
   generating demodulated data from the received data of the stream partition, and
   combining the demodulated data of the two or more demodulators into the data stream.

26. A non-transitory computer-readable recording medium that stores therein a computer program product, which, when executed by a processor, causes the method according to embodiment 16 or 25 to be performed.

27. A system for communicating data using at least two separate RF channels, said system comprising:
   at least one transmitter as defined in embodiment 1 and
   at least one receiver as defined in embodiment 16.

28. A computer program comprising program code means for causing a computer to perform the steps of said method according to embodiment 16 or 25 when said computer program is carried out on a computer.

The invention claimed is:

1. A transmitter for communicating data using at least two RF channels, the transmitter comprising:
   circuitry configured to:
      partition a data stream into a plurality of stream partitions by at least distributing baseband frames of a physical layer pipe (PLP) included in the data stream to the plurality of stream partitions, each one of the stream partitions including at least one baseband frame of the baseband frames of the PLP;
      generate first sets of modulation cells from the plurality of stream partitions;
      select a mode among a set of modes, the set of modes including at least a Multiple Input Multiple Output (MIMO) mode and a channel bonding mode;
      apply a MIMO encoding to the first sets of modulation cells to obtain second sets of modulation cells, in a case that the MIMO mode is selected;
      apply a channel bonding to the first sets of modulation cells to obtain the second sets of modulation cells, in a case that the channel bonding mode is selected;
      frame, interleave, and modulate the second sets of modulation cells according to an orthogonal frequency-division multiplexing (OFDM) modulation to obtain transmission signals; and
      transmit the transmission signals.

2. The transmitter as claimed in claim 1, wherein the circuitry, configured to generate the first sets of modulation cells from the plurality of stream partitions, includes a unified encoder.

3. The transmitter as claimed in claim 1, wherein each one of the first sets of modulation cells is generated by Forward Error Correction (FEC) encoding, and then bit-interleaving, and then modulation mapping a respective stream partition of the plurality of stream partitions.

4. The transmitter as claimed in claim 1, wherein the circuitry, in the case that the channel bonding mode is selected, is configured to rearrange two of the first sets of modulation cells to obtain two second sets of modulation cells for the two RF channels, respectively, by
   applying a matrix V(even) for multiplication with an input vector of two modulation cells of an even index from the two of the first sets of modulation cells, and
   applying a matrix V(odd) for multiplication with an input vector of two modulation cells of an odd index from the two of the first sets of modulation cells, wherein $$V(\text{even}) = \begin{bmatrix} 1 & 0 \\ 0 & 1 \end{bmatrix} \text{ and } V(\text{odd}) = \begin{bmatrix} 0 & 1 \\ 1 & 0 \end{bmatrix}.$$

5. A transmission method for communicating data using at least two RF channels, the transmission method comprising:
   partitioning a data stream into a plurality of stream partitions by at least distributing baseband frames of a physical layer pipe (PLP) included in the data stream to the plurality of stream partitions, each one of the stream partitions including at least one baseband frame of the baseband frames of the PLP;
   generating first sets of modulation cells from the plurality of stream partitions;
   selecting a mode among a set of modes, the set of modes including at least a Multiple Input Multiple Output (MIMO) mode and a channel bonding mode;

applying a MIMO encoding to the first sets of modulation cells to obtain second sets of modulation cells, in a case that the MIMO mode is selected;

applying a channel bonding to the first sets of modulation cells to obtain the second sets of modulation cells, in a case that the channel bonding mode is selected;

framing, interleaving, and modulating the second sets of modulation cells according to an orthogonal frequency-division multiplexing (OFDM) modulation to obtain transmission signals; and transmitting the transmission signals.

6. The transmission method as claimed in claim 5, wherein the generating the first sets of modulation cells from the plurality of stream partitions is performed by a unified encoder.

7. The transmission method as claimed in claim 5, wherein each one of the first sets of modulation cells is generated by Forward Error Correction (FEC) encoding, and then bit-interleaving, and then modulation mapping a respective stream partition of the plurality of stream partitions.

8. The transmission method as claimed in claim 5, wherein the applying the channel bonding includes rearranging two of the first sets of modulation cells to obtain two second sets of modulation cells for the two RF channels, respectively, by applying a matrix V(even) for multiplication with an input vector of two modulation cells of an even index from the two of the first sets of modulation cells, and applying a matrix V(odd) for multiplication with an input vector of two modulation cells of an odd index from the two of the first sets of modulation cells, wherein $$V(\text{even}) = \begin{bmatrix} 1 & 0 \\ 0 & 1 \end{bmatrix} \text{ and } V(\text{odd}) = \begin{bmatrix} 0 & 1 \\ 1 & 0 \end{bmatrix}.$$

9. A receiver for receiving data via at least two RF channels, the receiver comprising:

circuitry configured to:

receive transmission signals from the at least two RF channels;

demodulate the transmission signals according to an orthogonal frequency-division multiplexing (OFDM) demodulation and deinterleave a result of the OFDM demodulation to obtain sets of modulation cells;

select a mode among a set of modes, the set of modes including at least a Multiple Input Multiple Output (MIMO) mode and a channel bonding mode;

apply a MIMO decoding and demapping to the sets of modulation cells to obtain stream partitions of demodulated data, in a case that the MIMO mode is selected;

rearrange and demap the sets of modulation cells to obtain the stream partitions of demodulated data, in a case that the channel bonding mode is selected;

generate stream partitions of decoded data from the stream partitions of demodulated data; and combine the stream partitions into a data stream, baseband frames of a physical layer pipe (PLP) included in the data stream being partitioned to the stream partitions, each one of the stream partitions including at least one baseband of the baseband frames of the PLP.

10. The receiver as claimed in claim 9, wherein the circuitry, configured to generate the stream partitions of the decoded data, includes a unified decoder.

11. The receiver as claimed in claim 9, wherein the circuitry is configured to deinterleave and Forward Error Correction (FEC) decode the stream partitions of demodulated data to obtain the stream partitions of decoded data.

12. The receiver as claimed in claim 9, wherein the circuitry, in the case that the channel bonding mode is selected, is configured to rearrange two of the sets of modulation cells from the two RF channels, respectively, to obtain rearranged modulation cells by applying a matrix V(even) for multiplication with an input vector of two modulation cells of an even index from the two of the sets of modulation cells, and applying a matrix V(odd) for multiplication with an input vector of two modulation cells of an odd index from the two of the sets of modulation cells, wherein $$V(\text{even}) = \begin{bmatrix} 1 & 0 \\ 0 & 1 \end{bmatrix} \text{ and } V(\text{odd}) = \begin{bmatrix} 0 & 1 \\ 1 & 0 \end{bmatrix}.$$

13. The receiver as claimed in claim 9, wherein the receiver is an ATSC receiver.

14. The receiver as claimed in claim 9, wherein the receiver is a broadcast receiver.

15. A receiving method for receiving data via at least two RF channels, the receiving method comprising:

receiving transmission signals from the at least two RF channels;

demodulating the transmission signals according to an orthogonal frequency-division multiplexing (OFDM) demodulation and deinterleaving a result of the OFDM demodulation to obtain sets of modulation cells;

selecting a mode among a set of modes, the set of modes including at least a Multiple Input Multiple Output (MIMO) mode and a channel bonding mode;

applying a MIMO decoding and demapping to the sets of modulation cells to obtain stream partitions of demodulated data, in case that the MIMO mode is selected;

rearranging and demapping the sets of modulation cells to obtain the stream partitions of demodulated data, in case that the channel bonding mode is selected;

generating stream partitions of decoded data from the stream partitions of demodulated data; and combining the stream partitions into a data stream, baseband frames of physical layer pipe (PLP) included in the data stream being partitioned to the stream partitions, each one of the stream partitions including at least one baseband frame of the baseband frames of the PLP.

16. The receiving method as claimed in claim 15, wherein the generating the stream partitions of decoded data is performed by a unified decoder.

17. The receiving method as claimed in claim 15, wherein the generating the stream partitions of decoded data includes deinterleaving and Forward Error Correction (FEC) decoding the stream partitions of demodulated data to obtain the stream partitions of decoded data.

18. The receiving method as claimed in claim 15, wherein the rearranging and demapping the sets of modulation cells includes rearranging two of the sets of modulation cells from the two RF channels, respectively, to obtain rearranged modulation cells by applying a matrix V(even) for multiplication with an input vector of two modulation cells of an even index from the two of the sets of modulation cells, and applying a matrix V(odd) for multiplication with an input vector of two modulation cells of an odd index from the two of the sets of modulation cells, wherein $$V(\text{even}) = \begin{bmatrix} 1 & 0 \\ 0 & 1 \end{bmatrix} \text{ and } V(\text{odd}) = \begin{bmatrix} 0 & 1 \\ 1 & 0 \end{bmatrix}.$$

* * * * *

UNITED STATES PATENT AND TRADEMARK OFFICE
CERTIFICATE OF CORRECTION

| | | |
|---|---|---|
| PATENT NO. | : 11,115,255 B2 | Page 1 of 1 |
| APPLICATION NO. | : 16/989772 | |
| DATED | : September 7, 2021 | |
| INVENTOR(S) | : Jan Zoellner et al. | |

It is certified that error appears in the above-identified patent and that said Letters Patent is hereby corrected as shown below:

In the Claims

At Column 21, Line 66, replace "one baseband" with --one baseband frame--

At Column 22, Line 50, replace "of" with --of a--

Signed and Sealed this
Fifteenth Day of August, 2023

*Katherine Kelly Vidal*

Katherine Kelly Vidal
*Director of the United States Patent and Trademark Office*